United States Patent
Sakai et al.

(10) Patent No.: US 6,409,625 B1
(45) Date of Patent: Jun. 25, 2002

(54) CONTROLLER OF TOROIDAL CONTINUOUSLY VARIABLE TRANSMISSION

(75) Inventors: Hiromasa Sakai; Tsutomu Yamazaki, both of Yokosuka; Motoharu Nishio, Yokohama, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/708,706

(22) Filed: Nov. 9, 2000

(30) Foreign Application Priority Data

Nov. 10, 1999 (JP) .............................. 11-319571
Feb. 29, 2000 (JP) ....................... 2000-053133

(51) Int. Cl.⁷ .............................................. F16H 37/02
(52) U.S. Cl. ........................... 475/208; 472/2; 472/216
(58) Field of Search ................................ 475/209, 216, 475/2, 3

(56) References Cited

U.S. PATENT DOCUMENTS

| | | | | |
|---|---|---|---|---|
| 5,980,421 A | * | 11/1999 | Machida et al. | 476/10 |
| 6,080,079 A | * | 6/2000 | Sakai | 476/10 |
| 6,287,232 B1 | * | 9/2001 | Sakai et al. | 475/216 |

FOREIGN PATENT DOCUMENTS

| | | |
|---|---|---|
| JP | 05-039847 | 2/1993 |
| JP | 11-247964 | 9/1999 |

* cited by examiner

*Primary Examiner*—Dirk Wright
(74) *Attorney, Agent, or Firm*—Foley & Lardner

(57) ABSTRACT

A toroidal continuously variable transmission (1) comprises power rollers (18C, 18D, 20C, 20D) which transmit a torque between input disks (18A, 20A) and output disks (20A, 20B), and trunnions (104, 105, 114, 115) which drive the power rollers (18C, 18D, 20C, 20D) in a perpendicular direction to a rotation shaft (16A) according to a differential pressure between a first oil chamber (101) and a second oil chamber (102). When the second oil chamber (102) is at higher pressure than the first oil chamber (101), the toroidal continuously variable transmission (1) causes a downshift, and when the first oil chamber (101) is at higher pressure than the second oil chamber (102), the toroidal continuously variable transmission (1) causes an upshift. The first oil chamber (101) is connected to a first passage (176) and the second oil chamber (102) is connected to a second passage (177). A speed ratio control valve (70, 70A) controls a direction and a flowrate of the first passage (176) and the second passage (177). A pressure control valve (200, 210, 220, 40, 45, 41, 46) limits a maximum differential pressure of the first oil chamber (101) and the second oil chamber (102) when the transmission (1) causes a downshift to be less than a maximum differential pressure of the first oil chamber (101) and the second oil chamber (102) when the transmission (1) causes an upshift. This arrangement prevents a sharp downshift of the toroidal continuously variable transmission (1) due to a fault or incorrect operation.

14 Claims, 24 Drawing Sheets

CONTROLLER OF TOROIDAL CONTINUOUSLY VARIABLE TRANSMISSION

FIELD OF THE INVENTION

This invention relates to speed ratio control of a toroidal continuously variable transmission.

BACKGROUND OF THE INVENTION

Tokkai Hei 5-39847 published by the Japanese Patent Office in 1993 discloses a toroidal continuously variable transmission. This toroidal continuously variable transmission comprises an input disk and output disk which can rotate relative to each other on a common axis, and a pair of friction rollers gripped between these disks. The toroidal continuously variable transmission varies an inclination (gyration angle) of the friction roller, and transmits the rotation between the disks at an arbitrary speed ratio. The gyration angle of the friction roller varies due to the displacement of trunnions supporting the friction roller in the direction perpendicular to the rotation axis due to an oil pressure. The displacement of the trunnion varies the position of the contact points with the input disk and output disk of the friction roller. Due to the variation of these contact points, the input disk and output disk exert a component force which varies the gyration angle of the friction roller, and as a result, the gyration angle of the friction roller varies.

SUMMARY OF THE INVENTION

Servo pistons are fixed to the trunnions. The trunnions displace according to the differential pressure of oil chambers on both sides of the servo piston, and the variation of the gyration angle of the friction roller, i.e. the variation of the speed ratio, is faster the larger the differential pressure. A speed ratio control valve selectively connects the two oil chambers on either side of the servo pistons to an oil pressure source and a drain according to the displacement of a spool. The spool is joined to a step motor, and the friction roller is controlled to a gyration angle corresponding to the target speed ratio by inputting a signal corresponding to the target speed ratio to the step motor.

If the spool of the speed ratio control valve sticks in a specific position, or faulty operation occurs due to disturbance of the step motor, the speed ratio may vary sharply. In particular, if the spool sticks in a downshift position, a sharp downshift unrelated to the driver's intention is produced.

Similarly, when the spool sticks in an upshift position, a sharp upshift may occur, but as a downshift causes engine braking, the uncomfortable feeling given to the driver is greater for downshift than for upshift.

The differential pressure can be prevented from becoming excessive by controlling the stroke range of the spool. However if the stroke range of the spool is limited, it is possible that the required differential pressure may not be produced when the oil pressure of an oil pressure source drops.

It is therefore an object of this invention to prevent an excessive downshift pressure from acting on a piston without restricting the stroke range of the spool of the speed ratio control valve.

In order to achieve the above object, this invention provides a controller for a toroidal continuously variable transmission of a vehicle. The transmission comprises an input disk which rotates about a rotation shaft, an output disk which rotates about the rotation shaft, a power roller gripped by the input disk and the output disk and transmitting a torque between the input disk and output disk, and a trunnion which drives the power roller in a direction perpendicular to the rotation shaft according to a differential pressure of a first oil chamber and a second oil chamber. The transmission causes a downshift when the second oil chamber is at a higher pressure than the first oil chamber, and causing an upshift when the first oil chamber is at a higher pressure than the second oil chamber. The first oil chamber is connected to a first passage and the second oil chamber is connected to a second oil passage. The controller comprises a speed ratio control valve which controls a direction and a flowrate of oil in the first oil passage and the second oil passage, and a pressure control valve which limits a maximum differential pressure of the first oil chamber and the second oil chamber when the transmission causes a downshift smaller than a maximum differential pressure of the first oil chamber and the second oil chamber when the transmission causes an upshift.

The details as well as other features and advantages of this invention are set forth in the remainder of the specification and are shown in the accompanying drawings.

DESCRIPTION OF THE PREFERRED EMBODIMENTS

Figure 1:
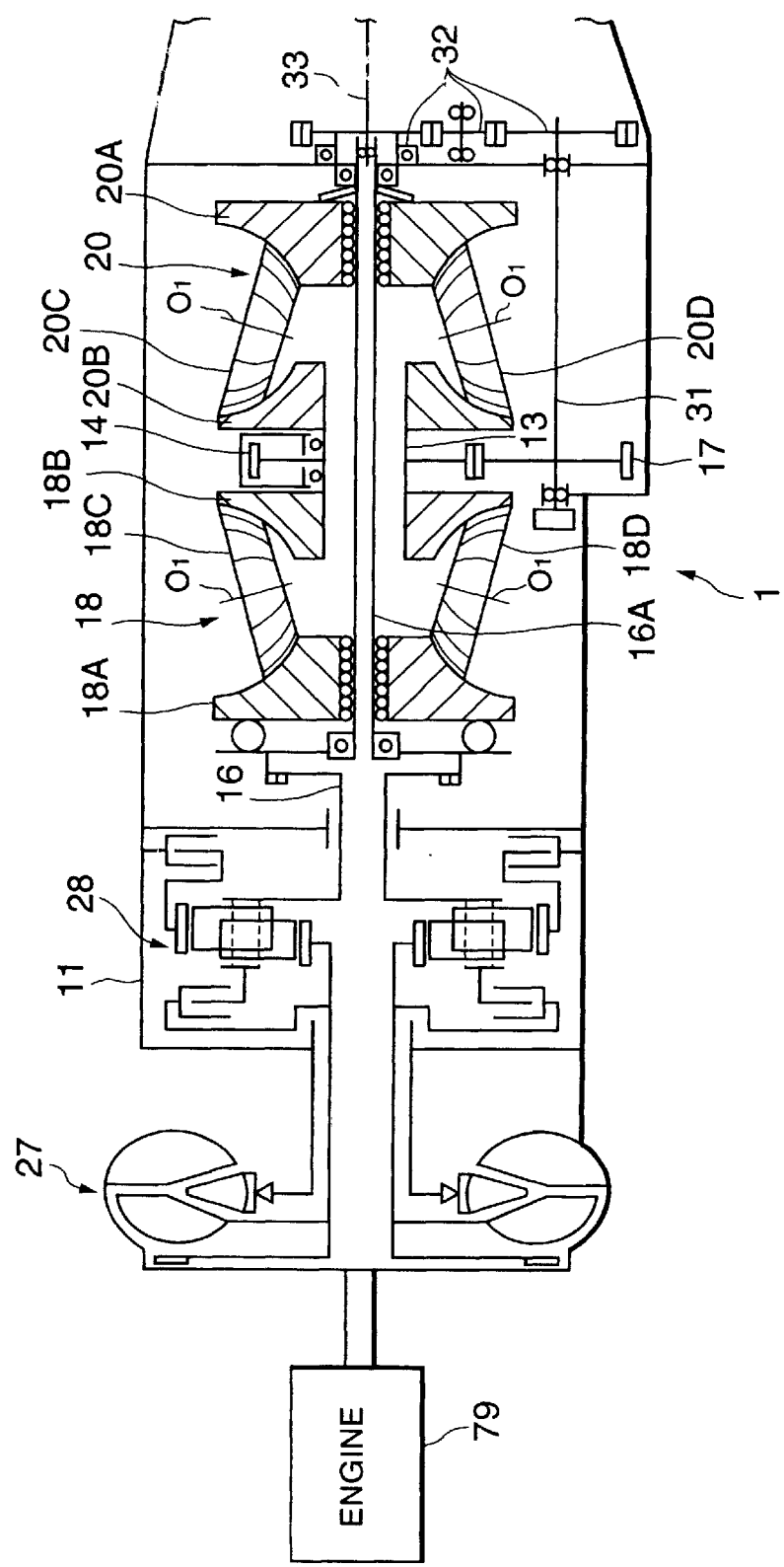
FIG. 1 is a schematic diagram of a toroidal continuously variable transmission according to this invention.

Referring to FIG. 1 of the drawings, a double cavity toroidal continuously variable transmission (abbreviated hereafter as toroidal CVT) 1 comprises two sets of toroidal units 18, 20 housed in a transmission case 11.

The first toroidal unit 18 comprises a pair of power rollers 18C, 18D gripped between an input disk 18A and output disk 18B. The second toroidal unit 20 comprises a pair of power rollers 20C, 20D gripped between an input disk 20A and output disk 20B.

The input disks 18A, 20A rotate together with a shaft 16A.

The output disks 18B, 20B are fixed to a hollow shaft 13 which is fitted free to rotate on the outer circumference of the shaft 16A. The rotation of the hollow shaft 13 is output to an output shaft 33 via an output gear 14, counter gear 17, counter shaft 31 and intermediate gears 32.

A rotation torque is input from an input shaft 16 to the shaft 16A. This rotation torque is transmitted from an engine 79 to the input shaft 16 via a torque converter 27 and a forward/reverse change-over clutch 28.

Figure 2A:
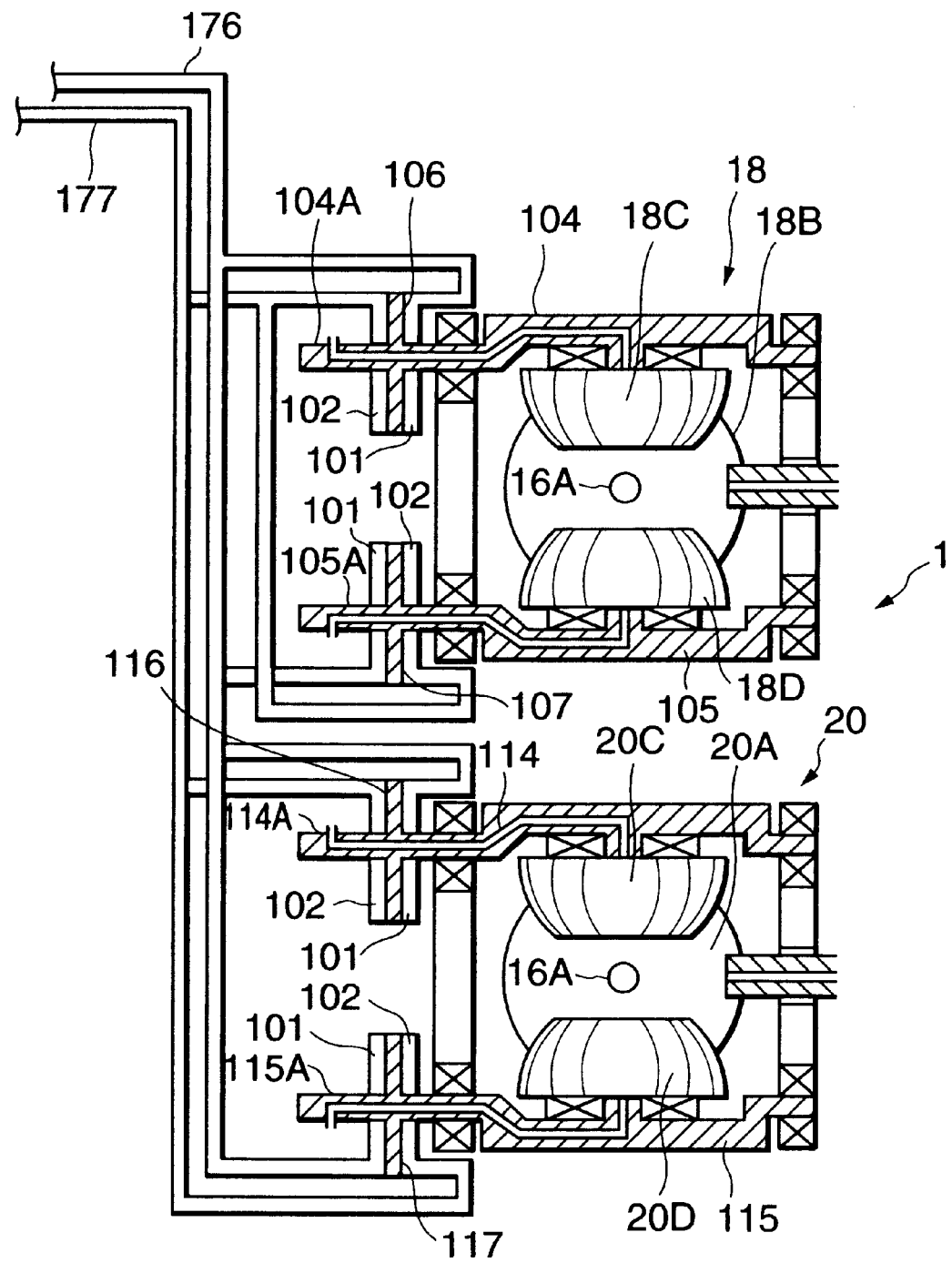
FIGS. 2A, 2B are oil pressure circuit diagrams of the toroidal continuously variable transmission according to this invention.
Figure 2B:
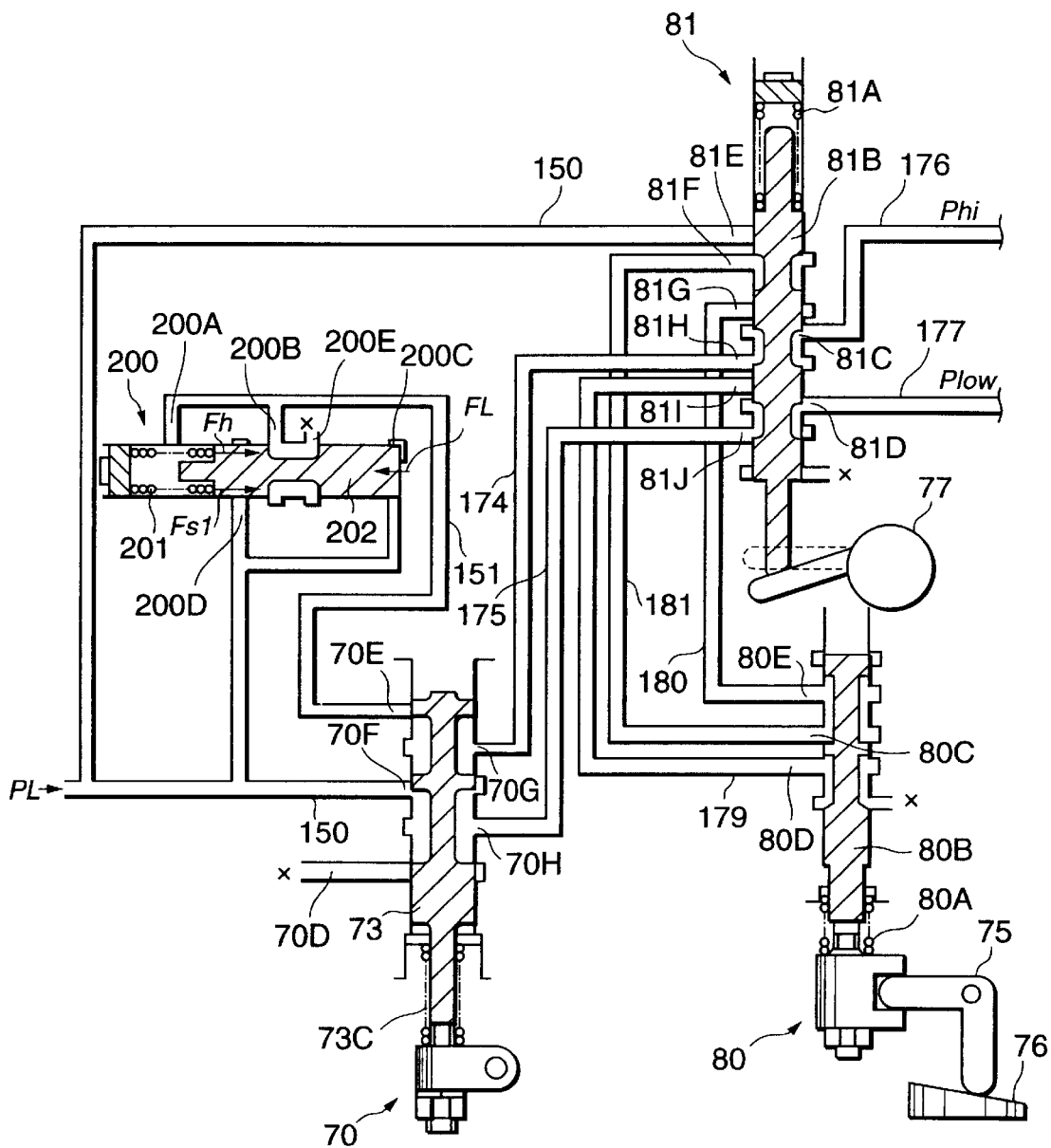

Referring now to FIGS. 2A, 2B, the power roller 18C is supported by a trunnion 104, and the power roller 18D is supported by a trunnion 105.

A server piston 106 is fixed to a trunnion 104. The servo piston 106 drives the trunnion 104 in the direction of a trunnion shaft 104A perpendicular to the shaft 16A according to a difference of oil pressures supplied to an upshift oil chamber 101 and a downshift oil chamber 102 on both sides. The trunnion 104 can also perform a rotational displacement around this trunnion shaft 104A.

Likewise, a trunnion 105 comprises a servo piston 107 which responds to the differential pressure of the upshift oil chamber 101 and downshift oil chamber 102 and drives the trunnion 105 along a trunnion shaft 105A.

The positions of the upshift oil chamber 101 and downshift oil chamber 102 of the trunnion 104 are the reverse of the positions of the upshift oil chamber 101 and downshift oil chamber 102 of the trunnion 105, so the trunnions 104, 105 are always driven in reverse directions.

As in the case of the first toroidal unit 18, the second toroidal unit 20 supports the power roller 20C by a trunnion 114 provided with a servo piston 116, and supports the power roller 20D by a trunnion 115 provided with a servo piston 117. The servo piston 116 responds to the differential pressure of the upshift oil chamber 101 and downshift oil chamber 102 which are disposed identically to those of the servo piston 106, and drives the trunnion 114 along a trunnion shaft 114A.

The servo piston 117 responds to the differential pressure of the upshift oil chamber 101 and downshift oil chamber 102 which are disposed identically to those of the servo piston 107, and drives the trunnion 115 along a trunnion shaft 115A.

Pressurized oil is supplied to the upshift oil chamber 101 and downshift oil chamber 102 via an oil pressure circuit shown in the diagram in order to generate a differential pressure between the upshift and downshift oil chambers 101, 102 based on a target speed ratio.

When the servo pistons 106, 107, 116, 117 drive the trunnions 104, 105, 114, 115 respectively along trunnion shafts 104A, 105A, 114A, 115A according to the differential pressure of these oil chambers 101, 102, the contact positions between the power rollers 18C, 18D, 20C, 20D, input disks 18A, 20A and output disks 18B, 20B vary. As a result, the gyration angles of the power rollers vary, and the speed ratio of the CVT 1 varies.

The oil pressure circuit comprises a speed ratio control valve 70, forward/reverse change-over valve 81, pressure control valve 200 and reverse speed ratio control valve 80.

These valves process a line pressure PL supplied by the line pressure circuit 150 from an oil pressure source, and supply processed pressures to a passage 176 leading to the upshift oil chambers 101 and a passage 177 leading to the downshift oil chambers 102.

The rotation of the engine of the vehicle is input to the CVT 1 via the forward/reverse change-over clutch 28.

Consequently, the direction of rotation input to the CVT 1 is different when the vehicle is moving forwards and backwards. The forward/reverse change-over valve 81 changes over in synchronism with the forward/reverse change-over clutch 28, and connects the speed ratio control valve 70 or reverse speed ratio control valve 80 to the passages 176, 177.

The forward/reverse change-over valve 81 comprises a spool 81B supported by a spring 81A, and ports 81C, 81D, 81E, 81F, 81G, 81H, 81I, 81J facing the spool 81B.

The port 81C communicates with the passage 176, and the port 81D communicates with the passage 177. The port 81E communicates with the line pressure circuit 150. The port 81F communicates with a passage 181, the port 81G communicates with a passage 180, the port 81H communicates with a passage 174, the port 81I communicates with a passage 179, and the port 81J communicates with a passage 175.

The spool 81B is driven by a lever 77 in synchronism with the forward/reverse change-over clutch 28.

Specifically, when the forward/reverse change-over clutch 28 is in the forward position, the port 81H is connected to the port 81C, the port 81J is connected to the port 81D, and the other ports are shut off as shown in the diagram.

On the other hand, when the/reverse change-over clutch 28 is in the reverse position, the port 81E is connected to the port 81F, the port 81C is connected to the port 81G, the port 81I is connected to the port 81D, and the other ports are shut off.

The speed ratio control valve 70 comprises a spool 73 elastically supported by a spring 73C, and ports 70D, 70E, 70F, 70G, 70H facing the spool 73. The port 70D communicates with a drain, and the port 70E is connected to a high-pressure supply passage 151 from the pressure control valve 200. The port 70F is connected to the line pressure circuit 150. The port 70G is connected to the passage 174 leading to the port 81H of the forward/reverse change-over valve 81, and the port 70H is connected to the passage 175 leading to the port 81J of the forward/reverse change-over valve 81.

The spool 73 is driven by a step motor, and displaces between a position in which the port 70G is connected to the port 70E while the port 70H is connected to the port 70F, and a position in which the port 70G is connected to the port 70F while the port 70H is connected to the port 70D. This displacement therefore causes a change in the pressure of the upshift oil chambers 101 and in the pressure of the downshift oil chambers 102. When the vehicle is traveling forwards, a command corresponding to the target speed ratio is input to the step motor so that the spool 73 displaces, and the gyration angles of the power rollers 18C, 18D, 20C, 20D of the CVT 1 coincide with the angle corresponding to the target speed ratio. As the speed ratio of the CVT 1 approaches the target speed ratio, a feedback mechanism, not shown, causes the spool 73 to displace in the opposite direction to the displacement due to the step motor. When the target speed ratio has been achieved, the spool 73 is held in a position where the displacements due to the step motor and feedback mechanism are balanced.

The reverse speed ratio control valve 80 comprises a spool 80B elastically supported by a spring 80A, and ports 80C, 80D, 80E facing a spool 80B. The port 80C communicates with the port 81F of the forward/reverse change-over valve 81 via a passage 181. The port 80D communicates with the port 81I of the forward/reverse change-over valve 81 via the passage 179. The port 80E communicates with the port 81G of the forward/reverse change-over valve 81 via the passage 180.

The spool 80B is driven by a precess cam 76 via an L-shaped link 75. The precess cam 76 is fixed to one of the trunnion shafts 104A, 105A, 114A, 115A, and transmits the rotational displacement of the trunnions 104, 105, 114, 115 and the displacement in the direction of the trunnion shafts 104A, 105A, 114A, 115A to a spool 88B via the L-shaped link 75.

When the forward/reverse change-over clutch 28 is in the reverse position, the forward/reverse change-over valve 81 connects the ports 81E and 81F, connects the port 81G to the port 81C leading to the upshift oil chambers 101, and connects the port 81I to the port 81F leading to the downshift oil chambers 102. As a result, the line pressure PL is supplied to the port 80C of the reverse speed ratio control valve 80, the port 80E is connected to the upshift oil chambers 101, and the port 80D is connected to the downshift oil chambers 102.

The target speed ratio of the CVT 1 when the vehicle is reversing is set to a constant value, and when the real speed ratio of the CVT 1 is less than the target speed ratio, the precess cam 76 moves the spool 88B upwards in FIG. 2B via the L-shaped link 75 so that the line pressure PL is supplied to the downshift oil chambers 102, and the CVT 1 performs a downshift. On the other hand, when the real speed ratio of the CVT 1 is greater than the target speed ratio, the precess cam 76 moves the spool 88B downwards in FIG. 2B via the L-shaped link 75 so that the line pressure PL is supplied to the upshift oil chambers 101, and the CVT 1 performs an upshift. In this way, the speed ratio of the CVT 1 when the vehicle is reversing is controlled to the fixed target speed ratio.

The above construction of the speed ratio control valve 70, forward/reverse change-over valve 81 and reverse speed ratio control valve 80 is known from the aforesaid Tokkai Hei 5-39847.

The pressure control valve 200 is provided to control the oil pressure of the port 70E of the speed ratio control valve 70. The pressure control valve 200 comprises a spool 202 elastically supported by a spring 201, and ports 200A, 200B, 200C, 200D together with a drain port 200E facing the spool 202.

The ports 200A, 200B communicate with the port 70E of the speed ratio control valve 70 via the passage 151. The ports 200D, 200C communicate with the line pressure passage 150.

Here, the relation between a pressure Fhc exerted by an oil pressure Phc of the port 200A on the spool 202, an elastic force Fs1 of the spring 201 and a force FL exerted by the line pressure PL of the port 200C on the spool 202, may be expressed by the following equation (1):

$$FL = Fhc + Fs1 \tag{1}$$

The elastic force Fs1 of the spring 201 is expressed by the following equation (2):

$$Fs1 = K1 \cdot X1 \tag{2}$$

where,

K1=spring constant, and

X1=stroke distance of spool 202.

If the pressure-receiving surface area of the oil pressure Phc on the end face of the spool 202 facing the port 200A is A1, the oil pressure Phc is given by the following equation (3):

$$\begin{aligned} Phc &= (FL - Fs1)/A1 \\ &= PL \cdot Ps1 \end{aligned} \tag{3}$$

In other words, the spool 202 displaces to a position where the equation (3) is satisfied as the line pressure PL, i.e. the force FL, varies.

Specifically, when the line pressure PL rises, the spool 202 displaces in the left-hand direction of FIG. 2B, and due to the narrowing of the passage between the port 200B and the drain port 200E, the oil pressure Phi of the port 70E of the speed ratio control valve 70 is caused to rise. The pressure control valve 200 shown in FIG. 2B corresponds to the case where the line pressure PL is zero and accordingly the oil pressure Phi is also zero, but when the line pressure PL is not zero, the oil pressure Phi is also not zero.

When the vehicle is traveling forwards and the CVT 1 performs an upshift, the spool 73 of the speed ratio control valve 70 is driven downwards in FIG. 2B by the step motor. As a result, the line pressure PL is supplied to the upshift oil chambers 101 via the passage 176, and the downshift oil chambers 102 communicate with the drain port 70D via the passage 177. The servo pistons 106, 107, 116, 117 displace according to this differential pressure, the gyration angles of the power rollers 18C, 18D, 20C, 20D vary, and the speed ratio of the CVT 1 is decreased.

On the other hand, when the CVT 1 is made to perform a downshift, the spool 73 of the speed ratio control valve 70 is driven upwards in FIG. 2B by the step motor. As a result, the line pressure PL is supplied to the downshift oil chambers 102 via the passage 177, and the downshift oil chambers 102 communicate with the port 70E via the passage 177. The oil pressure Phi due to the pressure control valve 200 acts on the port 70E. Therefore, the servo pistons 106, 107, 116, 117 displace according to the differential pressure of the line pressure PL and the oil pressure Phi, the gyration angles of the power rollers 18C, 18D, 20C, 20D are made to vary, and the speed ratio of the CVT 1 is increased. Here, the oil pressure Phi rises according to the increase of the line pressure PL as described above. Therefore, the maximum value of the differential pressure between the upshift oil chambers 101 and downshift oil chambers 102 during a downshift operation is less than the maximum value of the differential pressure during an upshift operation.

Figure 3:
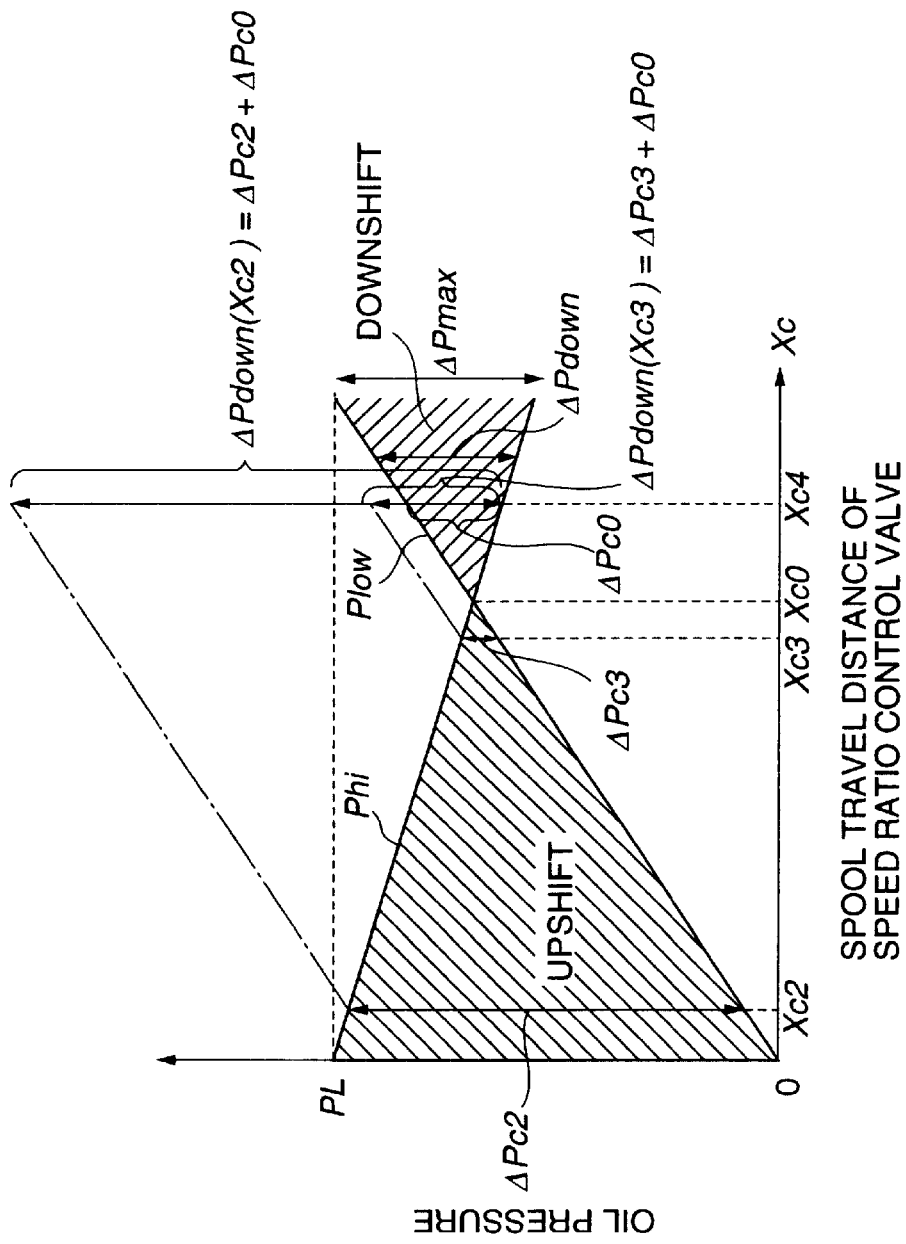
FIG. 3 is a diagram describing the relation between a stroke distance of a spool of a speed ratio control valve and various pressures according to this invention.

This differential pressure will now be described in more detail referring to FIG. 3.

Let the pressure of the upshift oil chambers 101 be Phi, the pressure of the downshift oil chambers 102 be Plow and the stroke distance of the spool 73 of the speed ratio control valve 70 be Xc. Let the stroke distance Xc=0 when the spool 73 of the speed ratio control valve 70 in FIG. 2B has descended to its lowermost position.

In this position, the line pressure PL is supplied from the port 70F to the upshift oil chambers 101, and the downshift oil chambers 102 are connected to the drain via the port 70D. Therefore, the pressure Phi is equal to the line pressure PL, and the pressure Plow is zero.

As the spool 73 strokes upwards, the pressure Phi decreases and the pressure Plow rises. Due to the rise of the spool 73, it communicates with the upshift oil chambers 101. The pressure of the port 70E is the pressure Phc controlled by the pressure control valve 200. Therefore, the stroke distance Xc increases, and when the upshift oil chambers 101 communicate only with the port 70E, Phi=Phc. Here, the pressure Phc is a pressure which varies according to the line pressure PL and is less than the line pressure PL, and provided that the line pressure PL is not zero, it is never zero.

Therefore, the decrease rate of the pressure Phi relative to increase of the stroke distance Xc is less than the increase rate of the pressure Plow.

When the pressures Phi, Plow are equal, the power rollers 18C, 18D, 20C, 20D are in a state such that torque transmission between the disks does not take place. In the following description, this state of the power rollers 18C, 18D, 20C, 20D will be referred to as the neutral state, and the stroke position of the spool 73 of the speed ratio control valve 70 at that time will be referred to as the neutral position.

Figure 8:
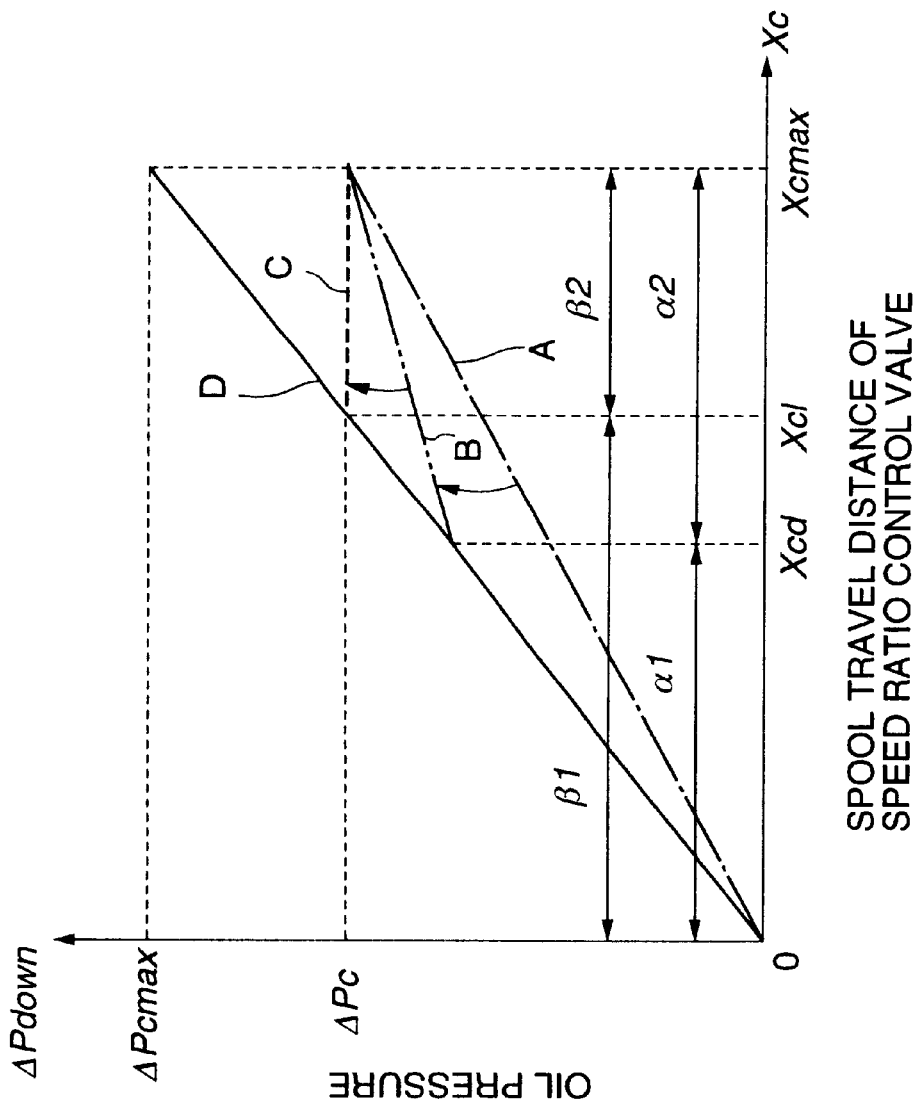
FIG. 8 is a diagram showing the relation between the stroke distance of the spool of the speed ratio control valve and a differential pressure according to the first, second and third embodiments of this invention in comparison with a toroidal continuously variable transmission according to the prior art.
Figure 9:
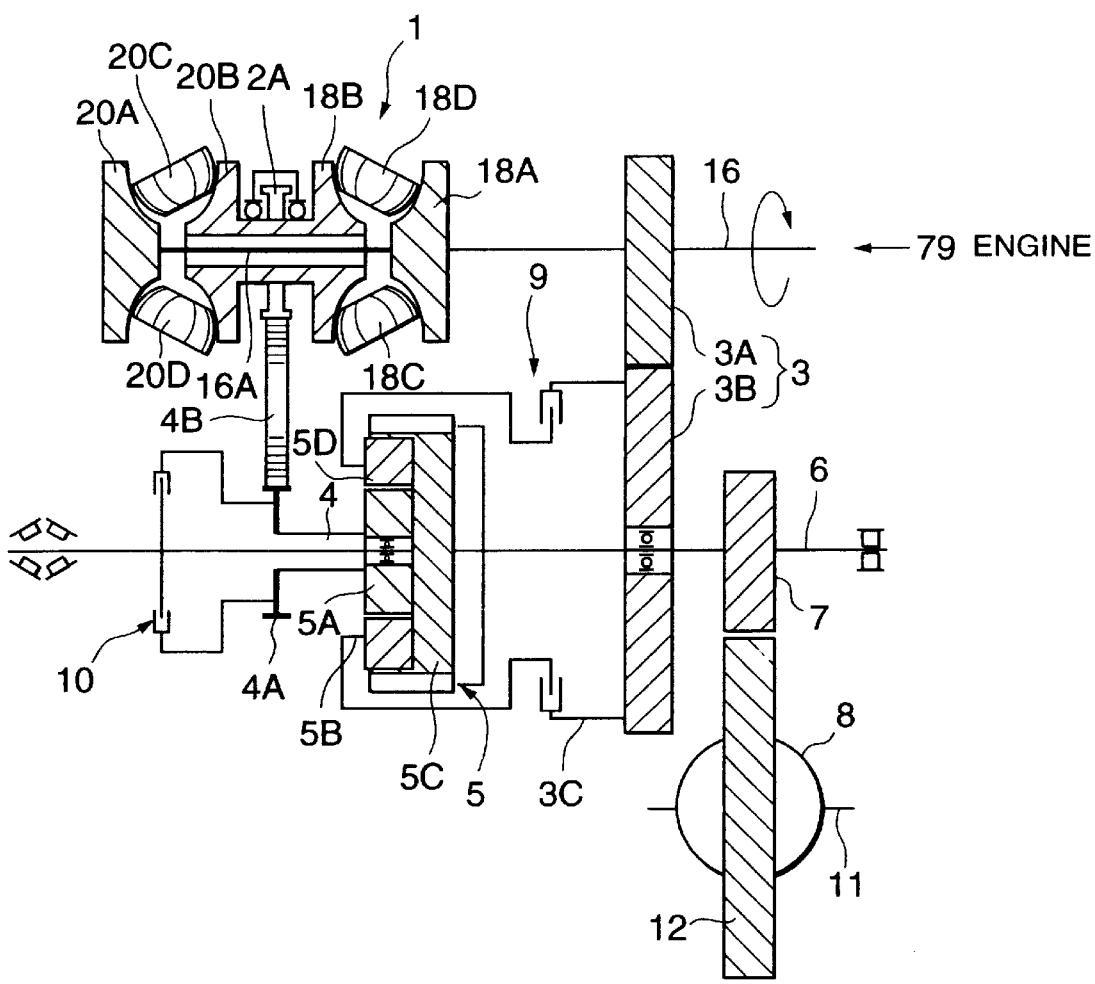
FIG. 9 is a schematic diagram of an infinite speed ratio transmission device according to a fourth embodiment of this invention.

As shown in the figure, as the decrease rate of the pressure Phi is small, a neutral position Xc0 is shifted to the right of the figure more than in the case where the decrease rate of the pressure Phi and increase rate of the pressure Plow are equal. As a result, the differential pressure ΔPdown between Phi and Plow which can be applied during a downshift operation is less than the differential pressure which can be applied during an upshift operation. Here, referring to FIG. 8, the solid line D shows the variation of the differential pressure ΔPdown when the pressure control valve 200 is not provided, and the dotted line A in the figure shows the differential pressure ΔPdown in this embodiment. By suppressing the increase rate of the differential pressure ΔPdown in the downshift direction relative to the stroke distance Xc of the spool 73 to be low as shown by the dotted line A, a maximum differential pressure ΔPc of this embodiment where the pressure control valve 200 is provided is suppressed low relative to a maximum differential pressure ΔPcmax when the pressure control valve 200 is not provided at a maximum stroke distance Xcmax.

In other words, an excessive downshift pressure is prevented from acting on the servo pistons 106, 107, 116, 117. Therefore, the disadvantage of a sharp downshift unrelated to the driver's intention due to sticking of the spool 73 or faulty operation of the step motor is prevented without restricting the stroke range of the spool 73.

Here, the differential pressure ΔPdown in the downshift direction is determined by the pressure Phi. The pressure Phi varies according to the pressure Phc controlled by the pressure control valve 200. The differential pressure ΔPdown therefore varies according to the spring constant K1 of the spring 201 of the pressure control valve 200.

When the servo pistons 106, 107, 116, 117 drive the power rollers 18C, 18D, 20C, 20D upwards or downwards from the neutral position, due to the variation of the contact positions between the power rollers 18C, 18D, 20C, 20D, input disks 18A, 20A and output disks 20A, 20D, a force acts on the power rollers 18C, 18D, 20C, 20D in the direction of gyration.

As a result of this force, the gyration angles of the power rollers 18C, 18D, 20C, 20D are made to vary, and the speed ratio of the CVT 1 is varied. The variation of the speed ratio is fed back to the speed ratio control valve 70 via the feedback mechanism, and when the real speed ratio reaches the target speed ratio, the speed ratio control valve returns the servo pistons 106, 107, 116, 117 to the neutral position.

On the other hand, in the state where a torque is transmitted between the input disks 18A, 20A and output disks 20A, 20B, a force in the axial direction corresponding to the transmitted torque acts on the trunnions 104, 105, 114, 115 supporting the power rollers 18C, 18D, 20C, 20D. At the same time, the upshift oil chambers 101 and downshift oil chambers 102 generate a differential pressure so as to support the servo pistons 106, 107, 116, 117.

When torque is transmitted from the engine to the drive wheels, torque is transmitted from the input disks 18A, 20A to the output disks 20A, 20B. In this case, an axial force in the downshift direction acts on the trunnions 104, 105, 114, 115, and the speed ratio control valve 70 maintains the pressure Phi of the upshift oil chambers 101 at a higher pressure than the pressure of the downshift oil chambers 102 so as to oppose this axial force. In other words, even if the power rollers 18C, 18D, 20C, 20D are in the neutral position, the stroke position of the spool 73 of the speed ratio control valve 70 fluctuates according to the magnitude of the transmitted torque. The position Xc0 in FIG. 3 is the stroke position of the spool 73 when the transmitted torque is zero, and when the transmitted torque increases, the stroke position of the spool 73 shift to the left of the figure to maintain the power rollers 18C, 18D, 20C, 20D in the neutral position.

Here, let the stroke position Xc of the spool 73 when the transmitted torque is large, be Xc2 in the figure. A differential pressure ΔPc2 in the upshift direction acts on the upshift oil chambers 101 and downshift oil chambers 102. In this state, when the differential pressure decreases to less than $\Delta Pc2$, the balance of forces is upset, and the power rollers 18C, 18D, 20C, 20D vary their gyration angles in the downshift direction.

On the other hand, let the stroke position of the spools 73 when the transmitted torque is small be Xc3 in the figure. Here, a differential pressure $\Delta Pc3$ in the upshift direction acts on the upshift oil chambers 101 and downshift oil chambers 102. In this case also, the balance of forces is upset when the differential pressure becomes less than $\Delta Pc3$, and the power rollers 18C, 18D, 20C, 20D vary their gyration angles in the downshift direction.

Next, the case will be considered where the stroke position Xc of the spool is equal to Xc4 in the figure. Here, a differential pressure $\Delta Pc0$ in the downshift direction acts on the upshift oil chambers 101 and downshift oil chambers 102. A fluctuation width $\Delta Pdown$ (Xc2) of the differential pressure from the stroke position Xc=Xc2 to Xc=Xc4 of the spool 73 is expressed by the following equation:

$$\Delta P\ down(Xc2) = \Delta Pc2 + \Delta Pc0 \quad (4)$$

Likewise, a fluctuation width $\Delta Pdown$ (Xc3) of the differential pressure from the stroke position Xc=Xc3 to Xc=Xc4 of the spool 73 is expressed by the following equation:

$$\Delta P\ down(Xc3) = \Delta Pc3 + \Delta Pc0 \quad (5)$$

Here, $\Delta Pc2 > \Delta Pc3$. Therefore, the relation $\Delta Pdown$ (Xc2) $>\Delta Pdown$ (Xc3) is satisfied. In other words, if the transmitted torque largely varies at the same speed ratio, the spool 73 also performs a large stroke.

This means that if the displacement position of the spool 73 is restricted to prevent a sharp downshift, it will no longer be possible to adapt to fluctuation of transmitted torque. According to this invention, as the stroke of the spool 73 is not limited, it is possible to fully adapt even to fluctuation of transmitted torque.

As the stroke position Xc of the spool 73 for maintaining the power rollers 18C, 18D, 20C, 20D in their neutral positions approaches zero together with the transmitted torque, the stroke distance for a downshift operation can be fully ensured.

Further, by making the decrease rate of the pressure Phi of the upshift oil chambers 101 small, the fluctuation rate of the differential pressure $\Delta Pdown$ relative to the stroke of the spool 73 becomes small. This means that even if noise interferes with the control of the step motor, the effect of noise on fluctuation of the differential pressure $\Delta Pdown$ is small.

A second embodiment of this invention will now be described referring to FIGS. 4 and 5.

According to this embodiment, instead of connecting the pressure control valve 200 to the port 70E, a pressure control valve 210 is interposed in the passage 175.

The pressure control valve 210 comprises a spool 212 elastically supported by a spring 211, together with ports 210A, 210B, 210C and a drain port 210D facing the spool 212. The ports 210A, 210B communicate with the port 70H of the speed ratio control valve 70. The port 210C permanently communicates with the passage 175 and the port 210B at the same time.

Figure 4:
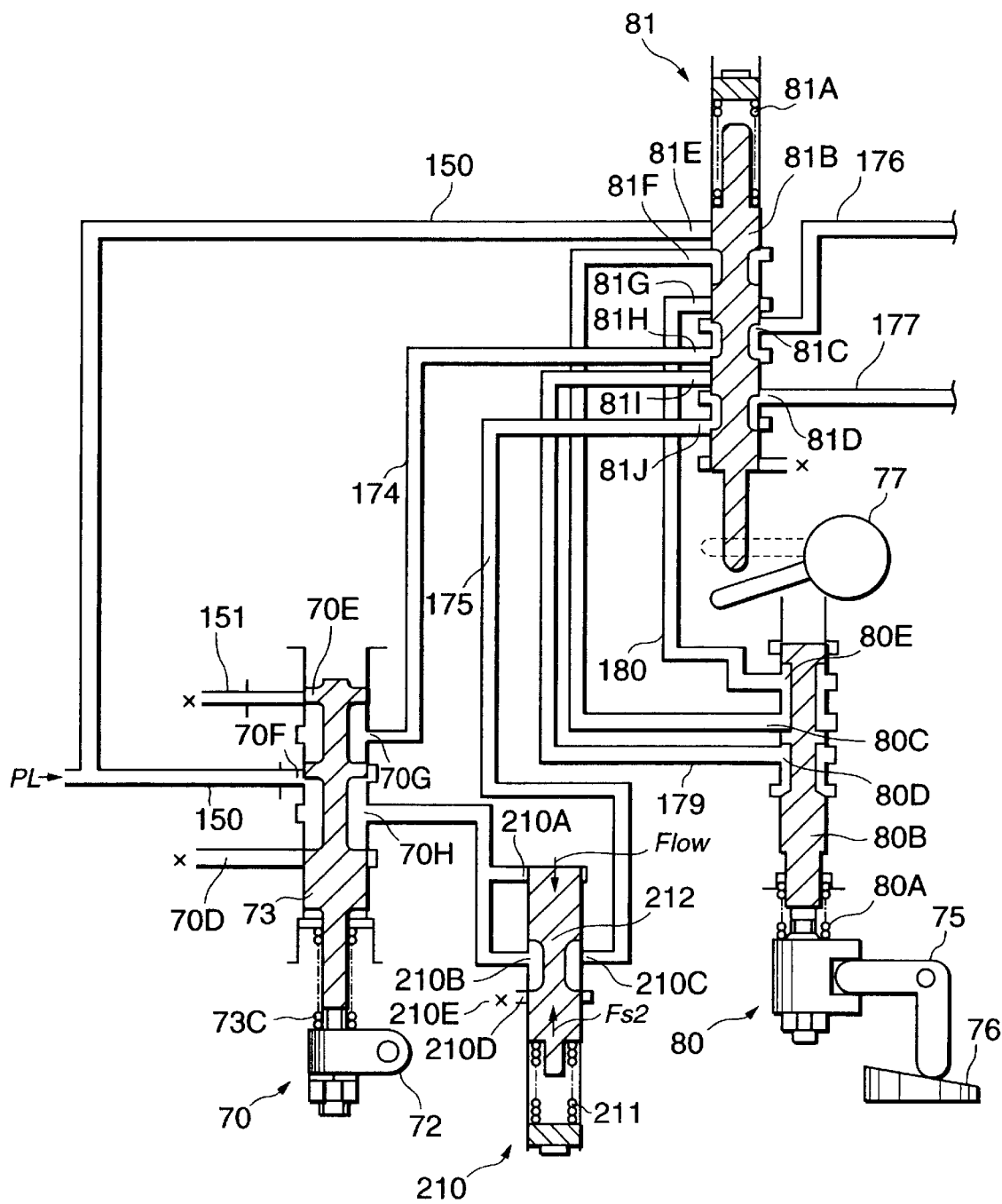
FIG. 4 is a partial oil pressure circuit diagram of the toroidal continuously variable transmission according to a second embodiment of this invention.

In this embodiment, when the pressure Plow supplied to the passage 175 from the port 70H rises, the spool 212 of the pressure control valve 210 strokes downward in FIG. 4 due to the pressure rise of the port 210A. As a result, the ports 210B, 210C communicate with the drain port 210E, and the pressure Plow stops rising.

Figure 5:
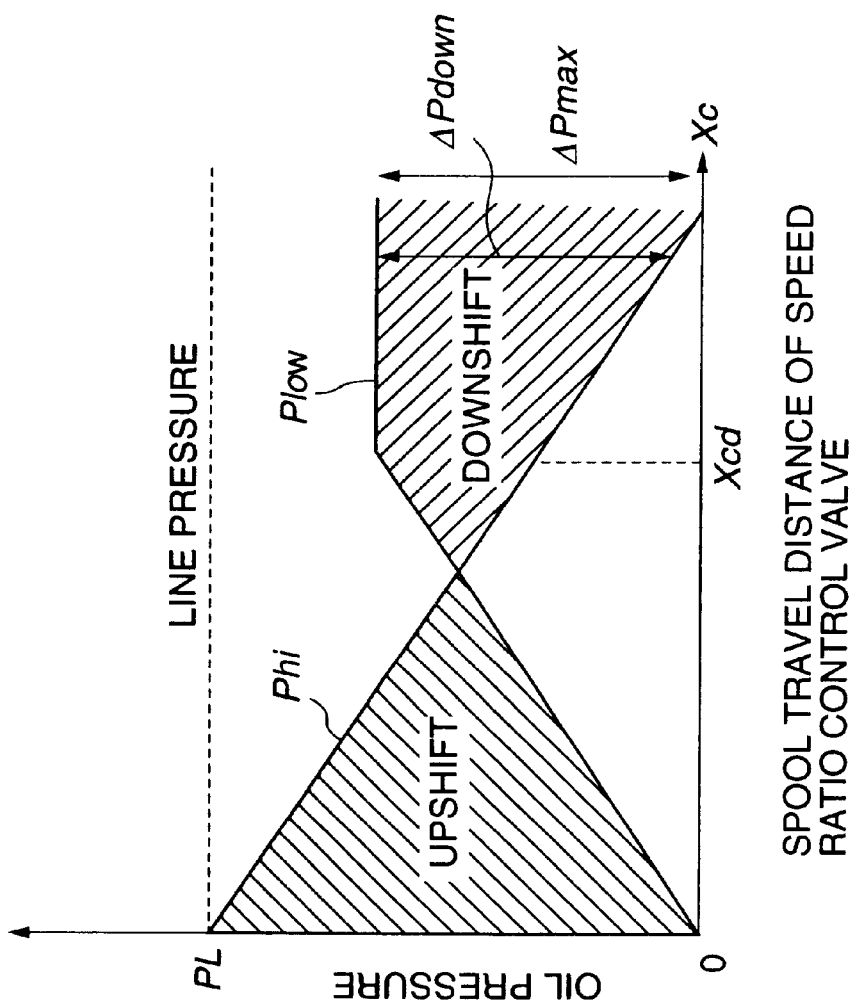
FIG. 5 is a diagram showing the relation between the stroke distance of the spool of the speed ratio control valve and a supply pressure thereof according to the second embodiment of this invention.

The relation between the stroke distance Xc of the spool 73, the pressure Phi of the upshift oil chambers 101 and the pressure Plow of the downshift oil chambers 102 is shown in FIG. 5.

Here, if the force exerted by the spring 211 of the pressure control valve 210 on the spool 212 is Fs2, the force exerted by the oil pressure Plow of the port 210A on the spool 212 is Flow, the stroke distance of the spool 212 is X2, and the stroke distance at which the ports 210B, 210C start communicating with the drain port 210E is X2d, the following equations (6) and (7) are satisfied.

When X2<X2d, $$F\ low = Fs2\ (X2) = K2 \cdot X2 \quad (6)$$

where, K2=spring constant.
When X2>X2d, $$F\ low = K2 \cdot X2d \quad (7)$$

If the surface area of the spool 212 receiving the pressure Plow is A2, the following equation (8) is satisfied.

$$P\ low = F\ low / A2 \quad (8)$$

Referring again to FIG. 8, the differential pressure $\Delta Pdown$ according to this embodiment is shown by a double dotted line B. Specifically, until the stroke distance Xc of the spool 73 reaches Xcd, it increases at the same rate as if the pressure control valve 200 were not provided. Let this section be a section $\alpha 1$. After the stroke distance Xc of the spool 73 reaches Xcd, as the pressure Plow then becomes constant, the increase rate of the differential pressure $\Delta Pdown$ is more gradual than the solid line D, as shown by the double dotted line B. Let the section from Xcd to Xcmax be a section $\alpha 2$.

Also, the maximum differential pressure at the maximum stroke distance Xcmax is a maximum differential pressure $\alpha Pc$ which is lower than the maximum differential pressure $\alpha Pcmax$ that is generated when the pressure control valve 210 is not provided. The value of this maximum differential pressure $\Delta Pc$ can be arbitrarily set by setting the spring constant K2 of the spring 21 and the stroke distance X2d of the spool 212. Therefore, according also to this embodiment, the disadvantage of a sharp downshift occurring unrelated to the driver's intention due to sticking of the spool 73 or faulty operation of the step motor can be prevented without limiting the stroke range of the spool 73.

According to this embodiment, the speed ratio variation characteristics of the CVT 1 vary in two stages in the section $\alpha 1$ and the section $\alpha 2$.

In the section $\alpha 1$ when the stroke distance Xc is less than the predetermined distance Xcd, the rate of speed ratio variation during a downshift is no different to the case where the pressure control valve 210 is not provided, therefore there is no effect on the rate of speed ratio variation in this section.

On the other hand, in the section $\alpha 2$, the rate of speed ratio variation during a downshift is slower than in the case where the pressure control valve 210 is not provided. Therefore, according to this embodiment, a sharp downshift can be prevented without largely affecting the speed ration variation response of the CVT 1.

A third embodiment of this invention will now be described referring to FIGS. 6 and 7.

According to this embodiment, instead of providing the pressure control valve 200 of the first embodiment, a pressure control valve 220 is interposed between the ports 70G, 70H of the speed ratio control valve 70 and the passages 174, 175.

The pressure control valve 220 comprises a spool 222 elastically supported by a spring 221, and ports 220A, 220B, 220C, 220D and 220E facing the spool 222.

The line pressure PL is led from the line pressure passage 150 the port to the port 220A. The port 220B communicates with the port 70G of the speed ratio control valve 70. The port 220E communicates with the passage 175. The port 220C, 220D communicate with the passage 174.

Figure 6:
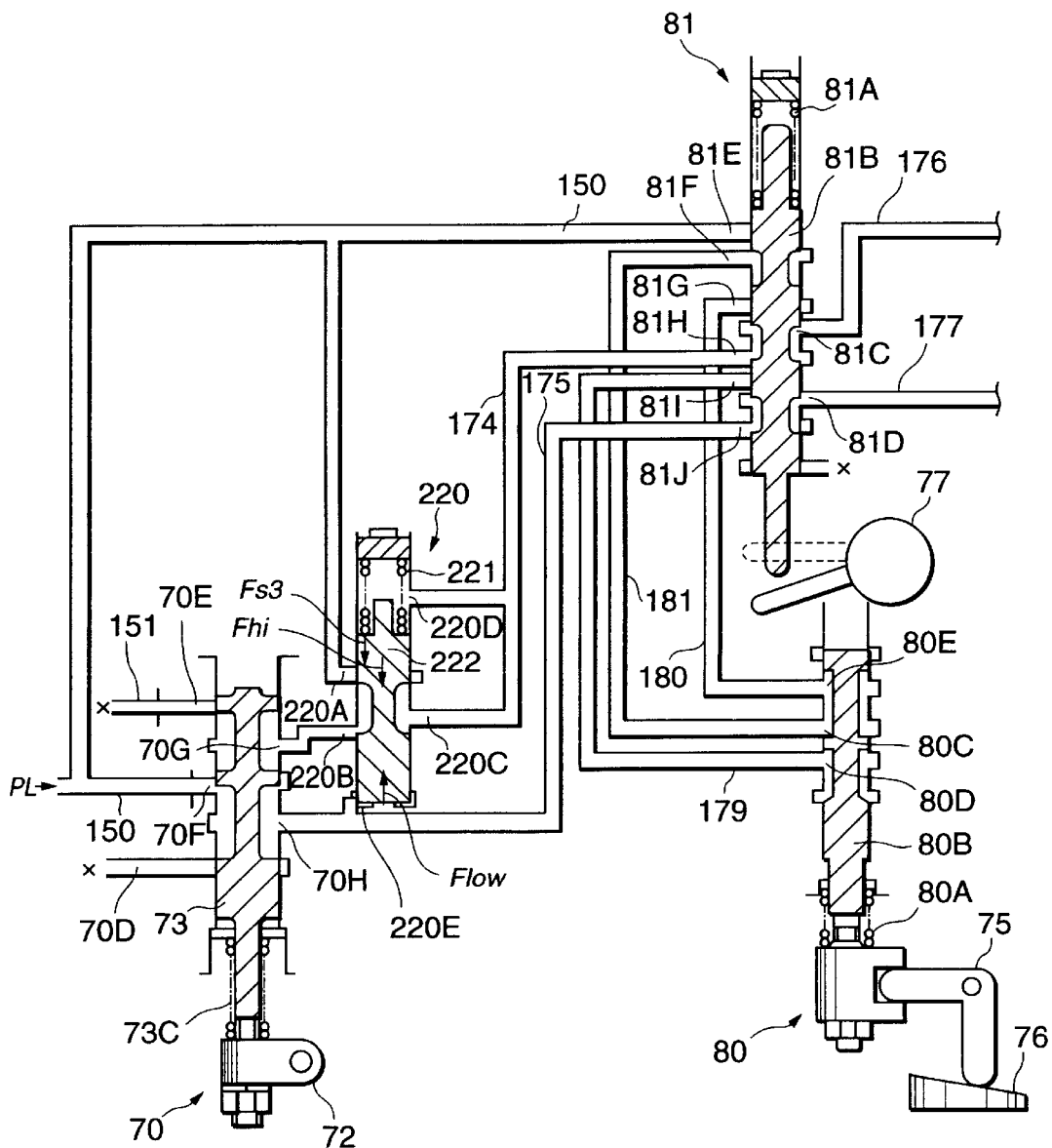
FIG. 6 is similar to FIG. 3, but showing a third embodiment of this invention.

According to this embodiment, when the pressure Plow in the passage 175 rises, the spool 222 strokes upward in FIG. 6. As a result, when the port 220C begins to communicate with the port 220A, the pressure Phi of the passage 174 begins to rise due to the effect of the line pressure PL, and the pressure Phi then rises according to the increase of the stroke distance Xc of the spool 222.

Here, let the force exerted by the pressure Phi of the port 210D on the upper end face of the spool 222 be F h i, the force exerted by the spring 221 on the spool 222 be Fs3, and the force exerted by the pressure Plow of the port 220E on the lower end face of the spool 222 be Flow.

Further, let the stroke distance of the spool 222 be X3, and the stroke distance at which the port 220C starts communicating with the port 220A be X3d.

When X3<X3d, the following equation (9) is satisfied.

$$F\,h\,i = F\,low - K3 \cdot X3 \tag{9}$$

where, K3=spring constant.

If the surface area of the spool 222 receiving the pressure Phi is A3, the following equation (10) is satisfied.

$$\begin{aligned}Phi &= Fhi/A3 \\ &= (Flow - K3 \cdot X3d)/A3 = Plow - Ps3 \\ \Delta Pdown &= Plow - Phi = -Ps3\end{aligned} \tag{10}$$

When X3≧X3d, the relations with the pressure acting on the spool 222 may be expressed by the following equations (11) and (12).

$$F\,h\,i = F\,low - K3 \cdot X3d \tag{11}$$

$$\begin{aligned}Phi &= Fhi/A3 \\ &= (Flow - K3 \cdot X3d)/A3 = Plow - Ps3d \\ \Delta Pdown &= Plow - Phi = -Ps3d\end{aligned} \tag{12}$$

Let the stroke distance Xc=0 when the spool 73 of the speed ratio control valve 70 has descended to its lowest position. In this position, the port 70F communicates with the port 70G, and the port 70D communicates with the port 70H. In the pressure control valve 220, the line pressure PL is supplied to the port 220B, and the port 220E is released to the drain. In the pressure control valve 220, when the spool 222 is in its lowest position as shown in FIG. 6, the port 200A is closed and the line pressure PL of the port 220B is supplied to the port 220C. In other words, the pressure Phi of the upshift oil chambers 101 is equal to the line pressure PL, and the pressure Plow of the downshift oil chambers 102 is released to the drain.

When the spool 73 strokes upwards in FIG. 6 from this state, the pressure of the port 70G decreases and that of the port 70H rises.

Figure 7:
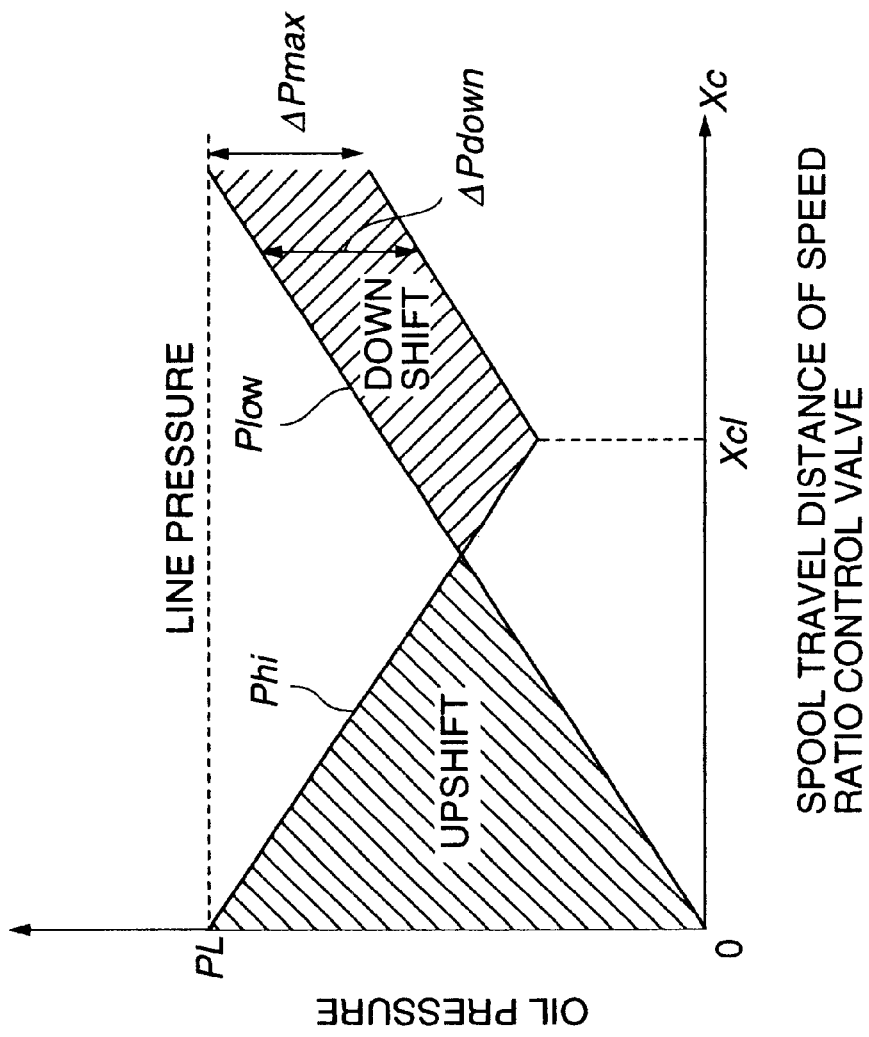
FIG. 7 is similar to FIG. 5, but showing the third embodiment of this invention.

As a result, in the pressure control valve 220, the relative magnitudes of the decreasing pressure Phi and increasing pressure Plow are finally inverted as shown in FIG. 7, and when this differential pressure rises further to exceed the spring load of the spring 221, the spool 222 begins to displace.

When the spool 222 displaces upwards in FIG. 6, the port 220C communicates with the port 220A to which the line pressure PL is led, and the port 220B which communicates with the drain is shut off. Therefore, the pressure Phi also rises according to the rise of the pressure Plow, and the differential pressure ΔPdown in the downshift direction subsequently maintains a constant value −Ps3d. Let the stroke distance of the spool 73 when the differential pressure ΔPdown is the constant value −Ps3d, be Xcl.

Referring here again to FIG. 8, the differential pressure ΔPdown in the downshift direction according to this embodiment is shown by a broken line C. When the stroke distance Xc of the spool 73 is equal to or less than Xcl, the pressure Phi of the upshift oil chambers 101 and the pressure Plow of the downshift oil chambers 102 vary with identical characteristics to the case where the pressure control valve 220 is not present.

Let the section between 0 and Xcl be β1. After the stroke distance Xc of the spool 73 exceeds Xcl, the pressure Phi also rises according to the rise of the pressure Plow, and the differential pressure ΔPdown in the downshift direction maintains the maximum differential pressure ΔPc. Let the section between Xcl and Xcmax be β2. The maximum differential pressure ΔPc may be arbitrarily set by setting the spring constant K3 of the spring 221 and the stroke distance X3d of the spool 222.

According to this embodiment, by providing the section β1 and the section β2, the speed ratio variation characteristics of the CVT 1 vary in two stages. In the section β1, the rate of speed change during a downshift is the same as if the pressure control valve 220 were not provided, while in the section β2, the rate of speed change during a downshift is a constant value, and is slower than if the pressure control valve 220 were not provided. Therefore, according also to this embodiment, the disadvantage of a sharp downshift unrelated to the driver's intention due to sticking of the spool 73 or faulty operation of the step motor can be prevented without restricting the stroke range of the spool 73 and without largely affecting the speed ratio variation response of the CVT 1.

A fourth embodiment of this invention will now be described referring to FIGS. 9–17.

According to this embodiment, an infinite variable speed ratio transmission device (referred to hereafter as IVT) using the CVT 1 is provided.

The IVT comprises the CVT 1, reduction gear unit 3 and planetary gear unit 5. The CVT 1 and reduction gear unit 3 are connected in parallel with the input shaft 16. The rotation outputs of the output disks 18B, 20B of the CVT 1 are output to an output shaft 4 via a sprocket 2A, chain 4B and sprocket 4A. The reduction gear unit 3 outputs the rotation of the input shaft 16 to an output shaft 3C at a predetermined reduction ratio by the engaging of an input gear 3A fixed to the input shaft 16 and a gear 3B.

The planetary gear unit 5 comprises a sun gear 5A, plural planet gears 5D supported on a planet carrier 5B, and a ring gear 5C.

The ring gear 5C is joined to a final output shaft 6.

The output shaft 4 is joined to the sun gear 5A. The output shaft 4 is also joined to the final output shaft 6 via a direct clutch 10. The output shaft 3C is joined to the planet carrier 5B via a power circulation clutch 9.

The rotation of the final output shaft 6 is transmitted to drive wheels 11 via gears 7, 12 and a differential gear unit 8.

In this IVT, the drive wheels 11 are driven either in a power circulation mode where the power circulation clutch 9 is engaged and the direct clutch 10 is disengaged, or in a direct mode where the power circulation clutch 9 is disengaged and the direct clutch 10 is engaged.

In the power circulation mode, the rotation speed of the planet carrier 5B is equal to a value obtained by dividing the engine rotation speed by the reduction ratio of the reduction gear unit 3. The reduction ratio of the reduction gear unit 3 is a fixed value. On the other hand, the rotation speed of the sun gear 5A is equal to a value obtained by dividing the engine rotation speed by a speed ratio lc of the CVT 1.

The rotation directions of the sun gear 5A and planet carrier 5B are always constant.

Under the above conditions, the rotation direction of the ring gear 5C joined to the final output shaft 6 varies according to the ratio of the rotation speed of the planet carrier 5B and the rotation speed of the sun gear 5C. In other words, it varies depending on the ratio of an engine rotation speed N e and a rotation speed No of the output shaft 4 of the CVT 1, i.e., depending on the speed ratio lc of the CVT 1. This variation point is referred to as a geared neutral point GNP shown in FIG. 23.

At the geared neutral point GNP, the ring gear 5C, i.e., the final output shaft 6, does not rotate, and the vehicle is stationary. When the CVT speed ratio lc increases beyond the geared neutral point GNP, the ring gear 5C rotates in the forward direction, and when the CVT speed ratio lc decreases to less than the GNP, the ring gear 5C rotates in the reverse direction.

In other words, in the power circulation mode, the vehicle changes over between forward and reverse motion by controlling the CVT speed ratio lc.

Figure 23:
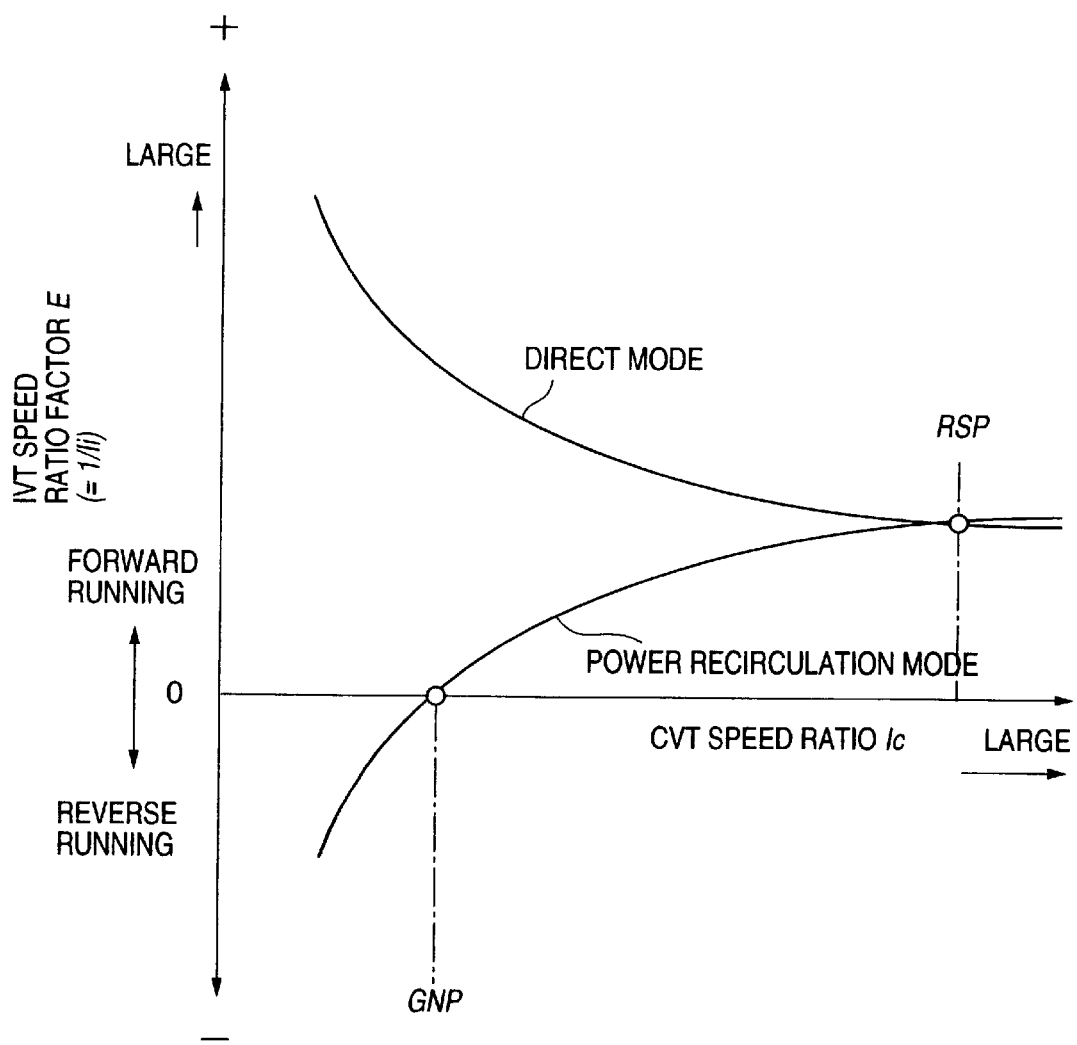
FIG. 23 is a diagram showing a general speed ratio characteristic of an infinite speed ratio transmission device.

When the vehicle is moving forwards in the power circulation mode, the IVT speed ratio li decreases as the CVT speed ratio lc increases. In other words, an IVT speed ratio coefficient E=1/li increases, as shown in FIG. 23.

When the IVT speed ratio coefficient E reaches a rotation synchronous point RSP, the IVT operating mode shifts from the power circulation mode to the direct mode. In the direct mode, the rotation of the output shaft 4 of the CVT 1 is directly output to the final output shaft 6, so the IVT speed ratio coefficient E increases as the CVT speed ratio lc decreases. When the vehicle is decelerating, the CVT speed ratio lc varies inversely to its behavior during acceleration. This characteristic of the IVT is disclosed in Tokkai Hei 9-89071 published by the Japanese Patent Office in 1997.

Figure 10:
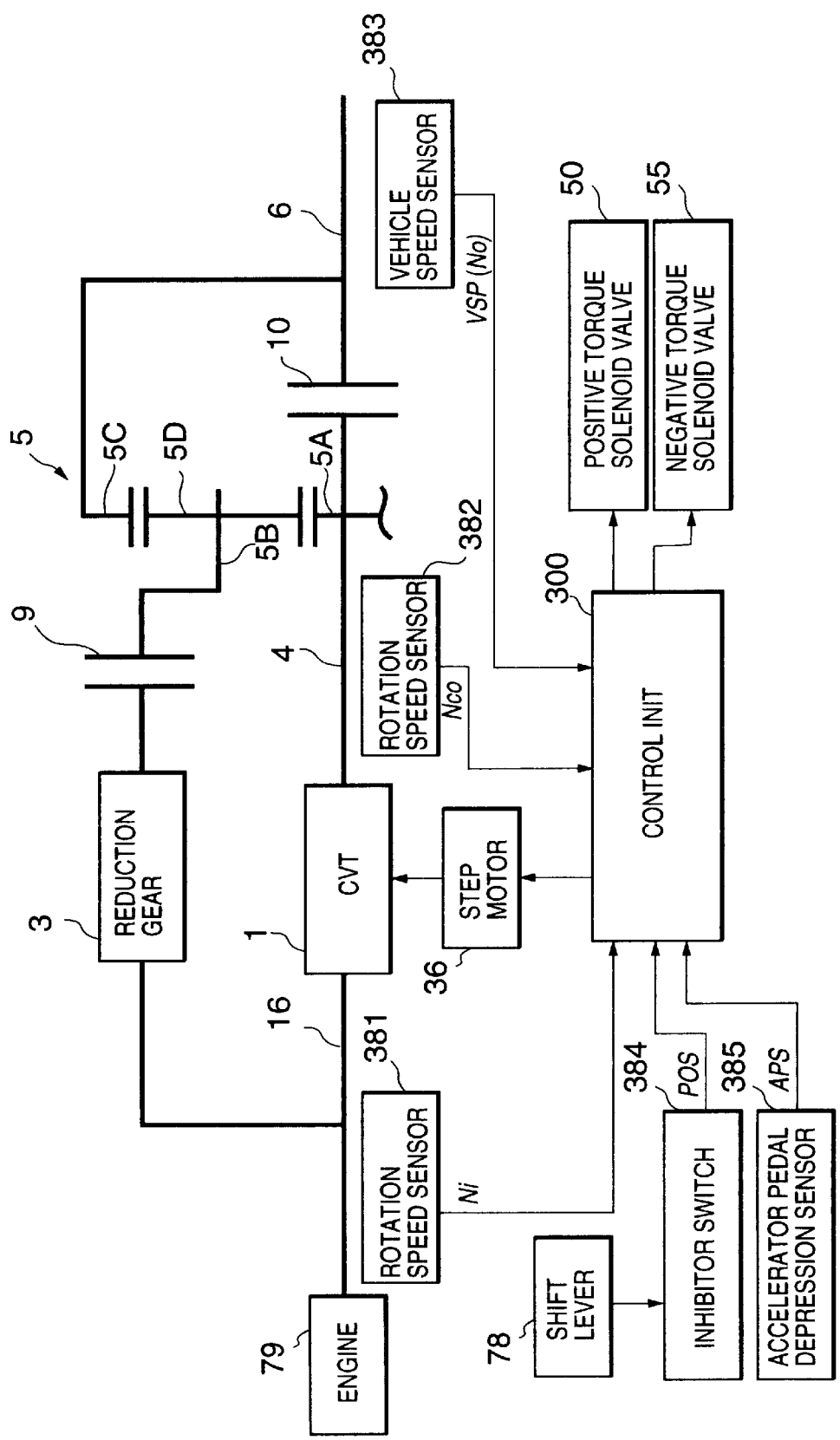
FIG. 10 is a schematic diagram of a control device of the infinite speed ratio transmission device according to the fourth embodiment of this invention.
Figure 11:
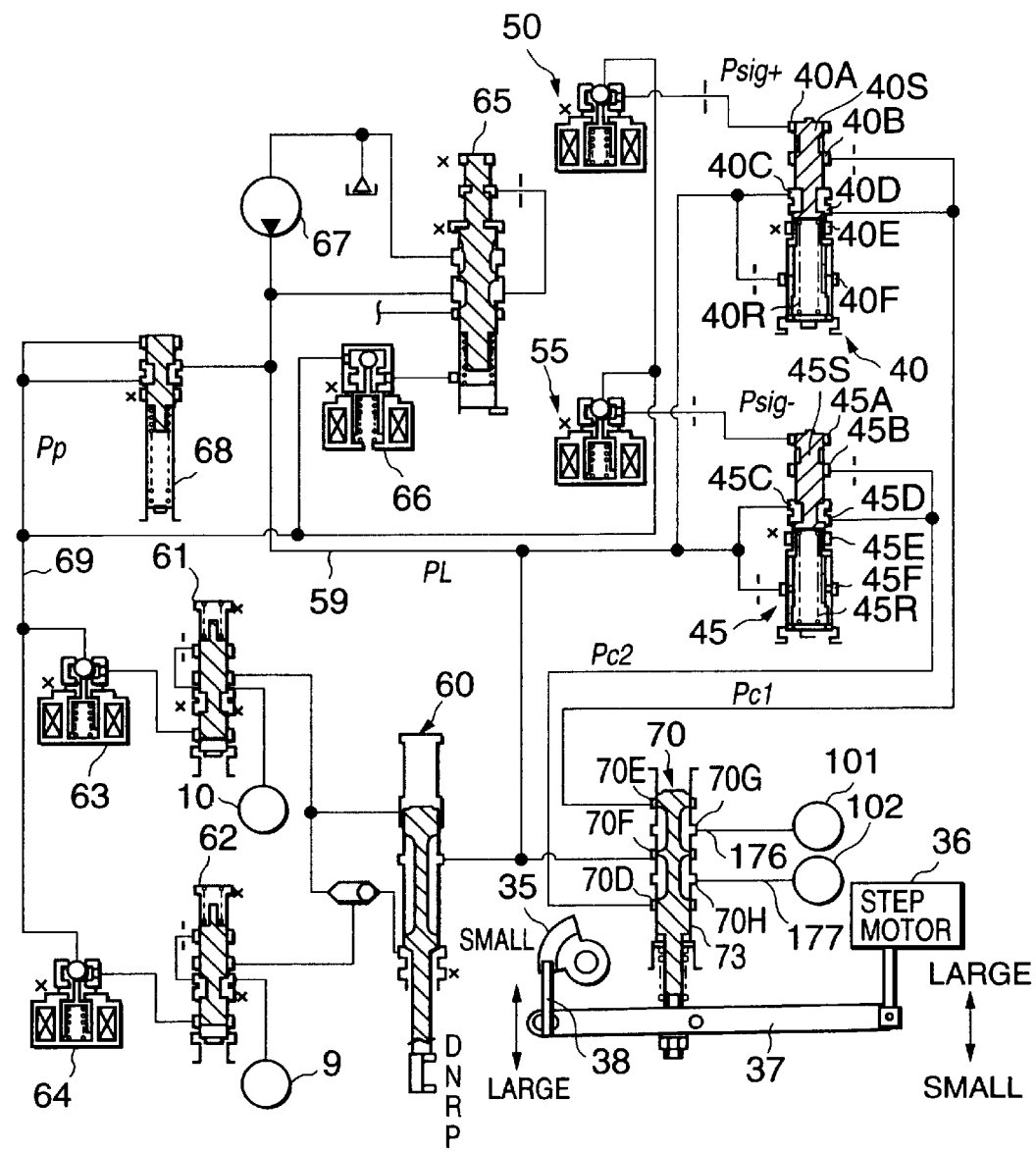
FIG. 11 is an oil pressure circuit diagram of the infinite speed ratio transmission device according to the fourth embodiment of this invention.

In this embodiment, the oil pressures of the upshift oil chambers 101 and downshift oil chambers 102 are controlled using an oil pressure circuit shown in FIG. 11 by the control unit shown in FIG. 10. The construction of the CVT 1 is identical to that of the first embodiment.

The oil pressure circuit comprises a speed ratio control valve 70, positive torque control valve 4, negative torque control valve 45, manual valve 60, clutch control valves 61, 62, pressure regulator valve 65, pilot valve 68 and oil pressure pump 67.

The speed ratio control valve 70 has an identical construction to the speed ratio control valve of the first embodiment.

In this embodiment, the spool 73 of the speed ratio control valve 70 is joined to the center part of a speed change link 37. A step motor 36 is joined to one end of the speed change link 37. A feedback link 38 which responds to the displacement of a precess cam 35 is joined to the other end of the speed change link 37.

Figure 12:
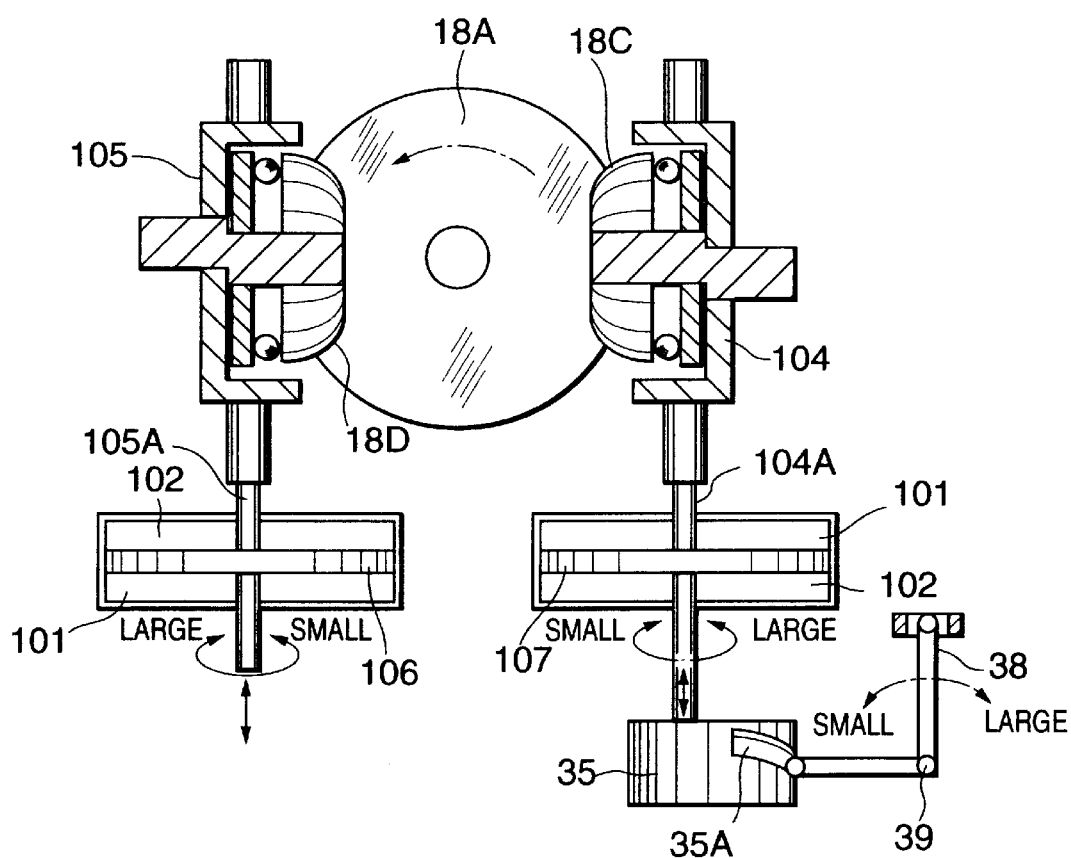
FIG. 12 is a schematic cross-sectional view of the toroidal continuously variable transmission applied to the infinite speed ratio transmission device.

Referring to FIG. 12, the precess cam 35 is fixed to the lower end of the trunnion shaft 104A. A cam groove 35A having a predetermined inclination is formed in the circumferential direction in the precess cam 35. One end of the feedback link 38 is joined to the cam groove 35A. The feedback link 38 is formed in an L-shape, and pivots around a pivot shaft 39.

In this way, the axial displacement and rotational displacement of the trunnion 104 are fed back to the spool 73 of the speed change control valve 70 by the precess cam 35. The spool 73 is held by the speed change link 37 in a position where the displacement due to the step motor 36 and the displacement due to the precess cam 35 are balanced.

Referring again to FIG. 11, the oil pressure supplied from the oil pressure pump 67 is adjusted to a predetermined line pressure PL by the pressure regulator valve 65, and supplied to a line pressure circuit 59. The pressure regulator valve 65 performs this pressure adjustment based on a signal pressure from a solenoid valve 90.

The solenoid valve 90 generates a signal pressure from a pilot pressure Pp of a pilot pressure circuit 69 according to an input signal from a control unit 300 shown in FIG. 10.

In addition to the speed ratio control valve 70, the positive torque control valve 40, negative torque control valve 45 and manual valve 60 are also connected to the line pressure circuit 59.

The manual valve 60 operates in synchronism with a shift lever 78 shown in FIG. 10, attached to the vehicle, and in a forward travel range (D), the line pressure of the line pressure passage 59 is supplied to the clutch control valves 61, 62. The clutch control valve 61 engages and disengages the direct clutch 10 using the line pressure PL according to the signal pressure of a solenoid valve 63. Likewise, the clutch control valve 62 engages and disengages the power circulation clutch using the line pressure PL according to the signal pressure of a solenoid valve 64. The solenoid valves 63, 64 generate the signal pressure from the pilot pressure Pp of the pilot pressure circuit 69 according to an input signal from the control unit 300.

The positive torque control valve 40 generates a control pressure Pc1 from the pilot pressure Pp of the pilot pressure circuit 102 according to a signal pressure Psig+ of a solenoid valve 50 controlled by the control unit 300, and supplies it to the port 70E of the speed ratio control valve 70. The negative torque control valve 45 generates a control pressure Pc2 from the pilot pressure Pp according to a signal pressure Psig– of a solenoid 55 controlled by the control unit 300, and supplies it to the port 70D of the speed ratio control valve 70. The solenoid valve 50 and solenoid valve 55 are both permanently closed valves that are closed in the non-energized state where the signal pressures Psig+, Psig– are zero.

The positive torque control valve 40 comprises a signal pressure port 40A facing a spool 40S, output port 40D which outputs the control pressure Pc1, feedback port 40B which communicates with the output port 40D, pressure port 40C and drain port 40E. The signal pressure Psig+ of the solenoid valve 50 is input to the signal pressure port 40A. The lower end of the spool 40S is elastically supported upwards by a spring 40R. The positive torque control valve 40 further comprises a sleeve 40P in contact with the lower end of the spool 40S, and a port 40F formed facing the sleeve 40P. The line pressure PL is led to the port 40F. The spool 40S is maintained in a position wherein the downward force in FIG. 11 due to the signal pressure Psig+ of the signal pressure port 40A and the control pressure Pc1 led to the feedback port 40B balances the upward force due to the spring 40R and the line pressure PL of the port 40F.

When the signal pressure Psig+ is equal to or less than a predetermined value, the pressure port 40C communicates with a drain port 70E of the speed ratio control valve 70 via an output port 40D. When the signal pressure Psig+ increases, the spool 40S displaces downwards against the spring 40R, and the output port 40D communicates with the drain port 40E.

The pressure-receiving surface area of the control pressure Pc1 acting on the spool 40S via the feedback port 40B is set to a value As equal to the pressure-receiving surface area of the line pressure PL acting on the sleeve 40P via the port 40F. The spool 40S is pushed upwards by the differential pressure of the line pressure PL and the control pressure Pc1. Here, if the pressure receiving surface area of the signal pressure Psig+ of the port 40A of the spool 40S is Asol, and the pushing force of the spring 40R F s,is the equilibrium of forces acting on the spool 40S may be expressed by the following equation (13):

$$(P\,sig+) \cdot A\,sol = (PL - Pc1) \cdot As + F\,s \quad (13)$$

Here, if we set M=Asol/As=constant, and N=F s/As= constant, equation (13) can be rewritten as the following equation (14):

$$PL - Pc1 = M \cdot (P\,sig+) - N \quad (14)$$

Equation (14) shows that the differential pressure ΔP1= PL−Pc1 can be controlled by the signal pressure Psig+.

When the signal pressure Psig+ is zero, ΔP1=PL−Pc1<0, but the control pressure Pc1 is obtained by reducing the line pressure PL, so it is never greater than the line pressure PL. Therefore, the spool 40S is pushed to its uppermost position by the pushing force F s, the pressure port 40C and output port 40D communicate, and Pc1=PL.

Figure 13:
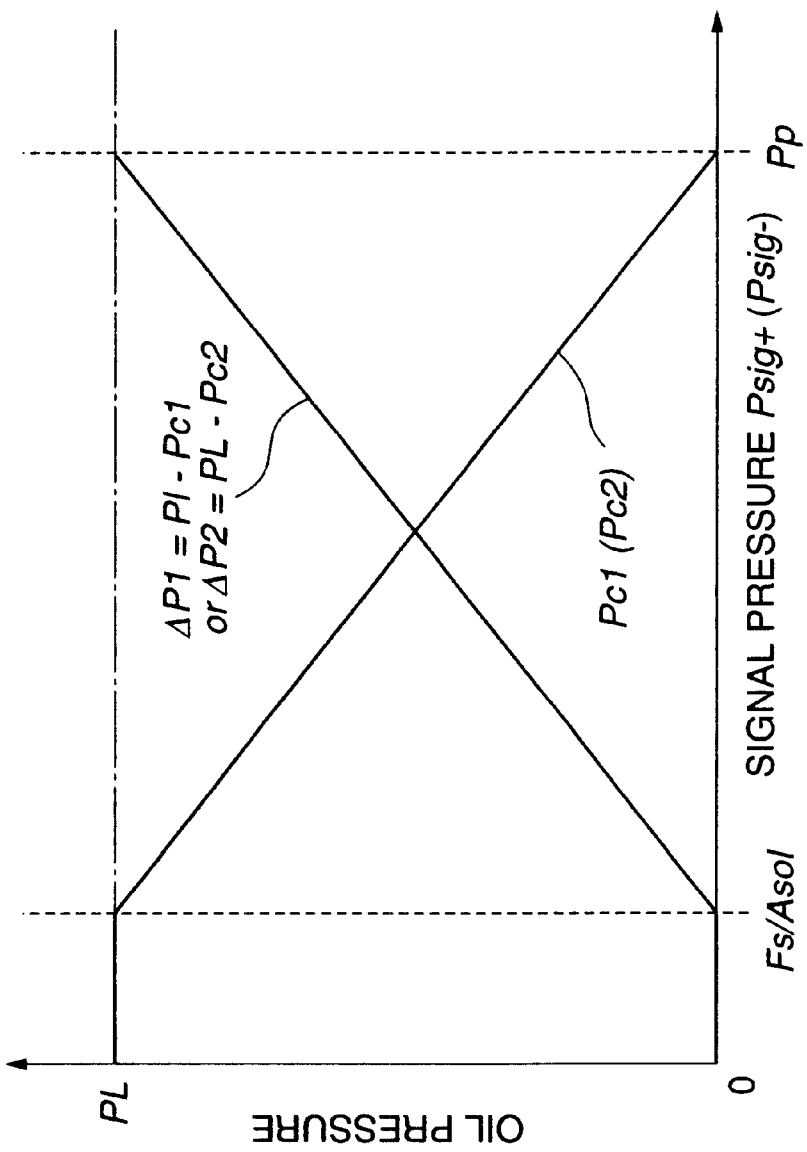
FIG. 13 is a diagram describing the relation between the signal pressure output by a control unit according to the fourth embodiment of this invention and various oil pressures.

Due to the pushing force F s of this spring 40R, as shown in FIG. 13, in the section from the signal pressure Psig+=0 to Psig+=N/M=F s/Asol, the control pressure Pc1 does not vary regardless of the signal pressure Psig+. This range is the dead zone of the positive torque control valve 40.

When the signal pressure Psig+ is larger than this range, the differential pressure ΔP1 increases according to the signal pressure Psig+. Further, when the signal pressure Psig+ reaches the pilot pressure Pp which is the maximum value, the pressure port 40C is closed by the spool 40S, and as the output port 40D communicates with the drain port 40E, the control pressure Pc1 is zero, and the differential pressure ΔP1 becomes equal to the line pressure PL.

When the line pressure PL varies, the control pressure Pc1 also varies, so the above relation between the control pressure Pc1 and the differential pressure ΔP1 holds even when the line pressure PL varies.

However, as there is the limitation 0≦Pc1≦PL, the range of the differential pressure ΔP1 becomes smaller the smaller the line pressure PL.

Hence, the positive torque control valve 40 controls the differential pressure ΔP1 according to the signal pressure Psig+, and when the solenoid valve 50 is not energized, the control pressure Pc1 is set equal to the line pressure PL so that the differential pressure ΔP1=0.

The negative torque control valve comprises a signal pressure port 45A, feedback port 45B, pressure port 45C, output port 45D which outputs a control pressure Pc2, drain port 45E, port 45F, spool 45S and spring 45R identical to those in the positive torque control valve 40. The control pressure Pc2 and line pressure PL have an identical relation to the control pressure Pc1 and line pressure PL, as shown in FIG. 13. In the figure, the differential pressure of the line pressure PL and control pressure Pc2 is referred to as ΔP2.

The control pressure Pc1 is supplied to the port 70E of the speed ratio control valve 70, and the control pressure Pc2 is supplied to the port 70D. The speed ratio control valve 70 controls the transmitted torque of the power rollers 18C, 18D, 20C, 20D by causing the differential pressure between one of the pressures Pc1 and Pc2 and the line pressure PL to act on the servo pistons 106, 107, 116, 117.

This oil pressure circuit is controlled by the control unit 300.

The control unit 300 comprises a microcomputer that has a central processing unit (CPU), read-only memory (ROAM), random access memory (RAM) and input/output interface (I/O interface).

Signals are input to the control unit 300 respectively from a rotation speed sensor 381 which detects a rotation speed Ni of the input shaft 16, rotation speed sensor 382 which detects a rotation speed Nco of the output shaft of the CVT 1, and a vehicle speed sensor 383 which detects a vehicle speed VSP from the rotation speed No of the final output shaft 6. The rotation speed Ni of an input shaft 1 is equal to the rotation speed N e of the engine 79.

A position signal POS from an inhibitor switch which detects the position of the shift lever 78 and a depression amount signal APS from an accelerator pedal depression amount sensor 385 which detects the depression amount of an accelerator pedal, not shown, with which the vehicle is provided, are also respectively input to the control unit 300.

The control unit 300 outputs signals to the solenoid valves 63, 64 according to these detected values, selectively joins the power circulation mode clutch 9 and direct mode clutch 10, and changes over the power circulation mode and direct mode. The step motor 36 is driven to control the speed ratio Ic of the CVT 1 so as to obtain the speed ratio Ii of the IVT according to the running state. Further, in the power circulation mode, a the transmission torque of the CVT 1 is controlled by a signal output to the solenoid valve 50 or 55. The control of the transmission torque of the CVT is disclosed in Tokkai Hei 11-247964 published by the Japanese Patent Office in 1999.

For example, the magnitude of the differential pressure ΔP1 (ΔP2) applied to the servo pistons 106, 107, 116, 117 of the CVT 1 is determined by the transmission torque of the power rollers 18C, 18D, 20C, 20D Therefore, by making the control pressure Pc1 or Pc2 equal to the line pressure PL, the differential pressure ΔP1 (ΔP2) becomes zero, and the transmission torque can be set to zero. By making the differential pressure ΔP1 (ΔP2) equal to zero while applying pressures on both sides of the servo pistons 106, 107, 116, 117, fluctuation in the differential pressure ΔP1 (ΔP2) produced due to the variation of the volume elastic coefficient when air, for example, becomes mixed with the oil, can be suppressed.

When the control of the differential pressure is performed, it is necessary to change over the speed ratio control valve 70 according to the direction of the torque supported by the servo pistons 106, 107, 116, 117. For example, providing that the rotation direction of the input disk 18A is the direction shown in FIG. 12 and the torque is transmitted from the input disk 18A to the output disk 18B (positive torque), an upward force acts on the trunnion 104 due to the transmission of the torque between the disks 18A, 18B. This force is supported by the differential pressure ΔP2 of the line pressure PL of the upshift oil chambers 101 and the control pressure Pc2.

Therefore, the positive torque transmitted from the input disk 18A to the output disk 18B can be controlled by varying the control pressure Pc2.

Conversely, the torque (negative torque) transmitted from the output disk 18B to the input disk 18A exerts a downward force on the trunnion 104, and the differential pressure $\Delta P1$ of the line pressure PL of the downshift oil chambers 102 and the oil pressure Pc1 of the upshift oil chambers 101 supports this force. Therefore, the negative torque transmitted from the output disk 18B to the input disk 18A can be controlled by varying the control pressure Pc1.

In the power circulation mode, whether the vehicle moves forward or backward is determined according to the difference of the rotation speed of the planet carrier 5B and the sun gear 5A. When the rotation speed of the planet carrier 5B is greater than the rotation speed of the sun gear 5A, i.e., when the speed ratio lc of the CVT 1 is greater than the geared neutral point GNP shown in FIG. 23, the vehicle moves forward. Due to the input torque from the chain 4B to the output disks 18D, 20D, torque is transmitted in the CVT 1 from the output disks 18A, 20A to the input disks 20A, 20B. In other words, a negative torque is transmitted. This negative torque is transmitted from the shaft 16A to the reducing gear unit 3, and is recirculated to the reducing gear unit 3 via the planetary gear unit 5 and CVT 1. Therefore, when the vehicle is moving forward in the power circulation mode, the differential pressure $\Delta P1$ of the line pressure PL of the downshift oil chambers 102 and the control pressure Pc1 of the upshift oil chambers 102 is controlled. To control the engine brake when the vehicle is moving forward in the power circulation mode, the differential pressure $\Delta P2$ of the line pressure PL of the upshift oil chambers 101 and control pressure Pc2 of the downshift oil chambers 102 is controlled.

When the rotation speed of the sun gear 5A is greater than the rotation speed of the planet carrier 5B, i.e., when the speed ratio lc of the CVT 1 is less than the geared neutral point GNP shown in FIG. 28, the vehicle reverses. In this case, the rotation torque of the sun gear 5A is transmitted to the planet carrier 5B and ring gear 5C, and torque is transmitted in the CVT 1 from the input disks 18A, 20A to the output disks 18B, 20B. In other words, a positive torque is transmitted. The torque transmitted to the planet carrier 5B is recirculated to the input disks 18A, 20A of the CVT 1 via the reducing gear unit 3. Therefore, when the vehicle is reversing in the power circulation mode, the differential pressure $\Delta P2$ of the line pressure PL of the upshift oil chambers 101 and control pressure Pc2 of the downshift oil chambers 102 is controlled. To control the engine brake when the vehicle is reversing in the power circulation mode, the differential pressure $\Delta P1$ of the line pressure PL of the downshift oil chambers 102 and the control pressure Pc1 of the upshift oil chambers 101 is controlled.

In the direct mode, the output torque of the CVT 1 is output to the final output shaft 6, the vehicle is driven by a positive torque, and the negative torque causes engine braking. Therefore, in the direct mode, the transmitted torque is controlled by controlling the differential pressure $\Delta P2$ of the line pressure PL and control pressure Pc2 when the vehicle is moving forward, and controlling the differential pressure $\Delta P1$ of the line pressure PL and control pressure Pc1 when the vehicle is reversing.

Figure 14:
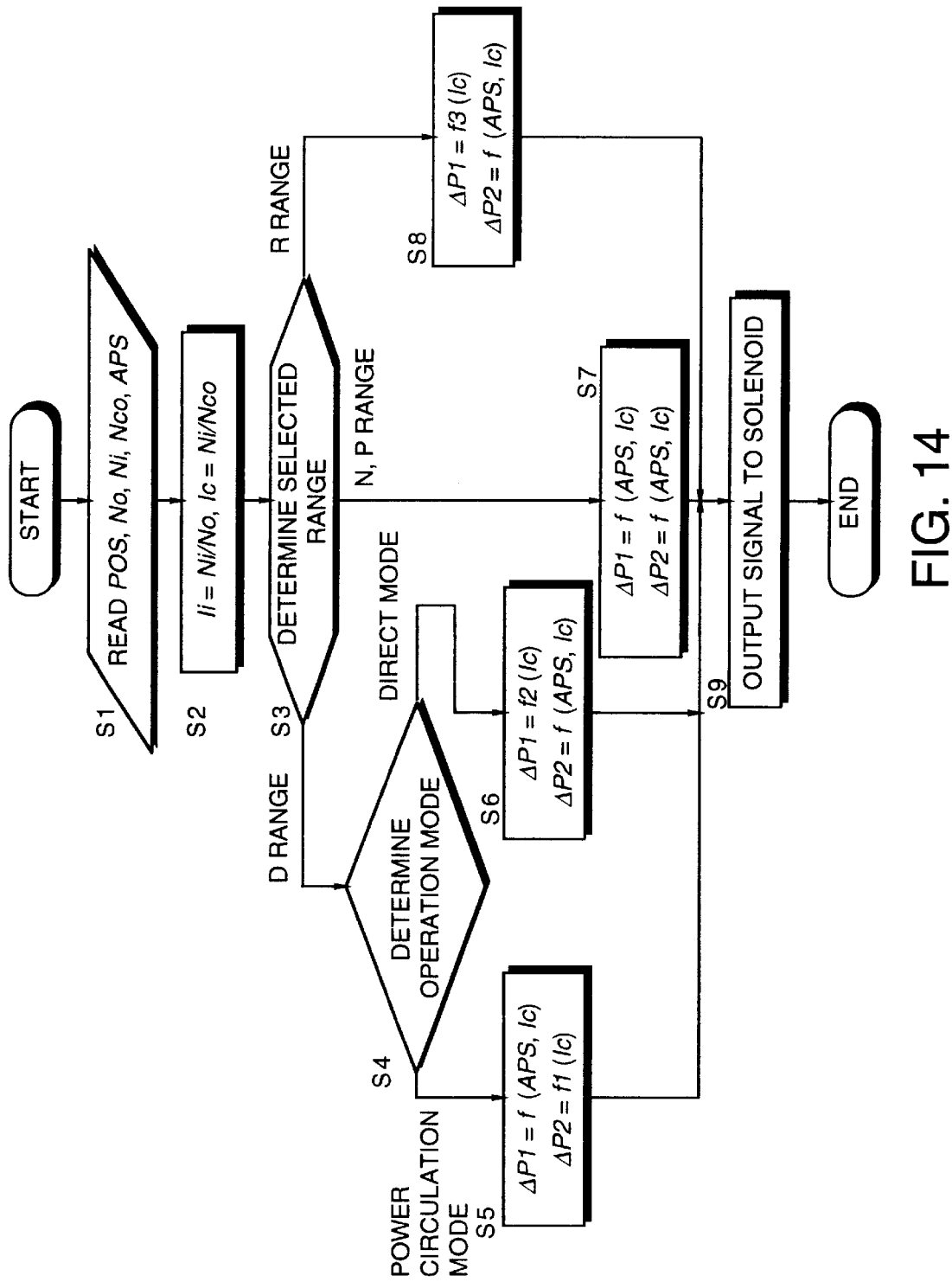
FIG. 14 is a flowchart describing a differential pressure control routine performed by a the control unit according to the fourth embodiment of this invention.

Now, to prevent excessive engine braking unintended by the driver when the vehicle is running, the control unit 300 controls the differential pressure by performing the control routine shown in FIG. 14. This routine is executed at an interval of ten milliseconds.

First, in a step S1, the position signal POS of the shift lever 78 and accelerator pedal depression amount APS are read. The selection position of the shift lever 78 is any of a drive range (D), reverse range (R), neutral range (N) and parking range (P).

In a step S2, the speed ratio lc of the CVT 1 and the speed ratio li of the IVT are computed from the input shaft rotation speed Ni of the CVT 1, the output shaft rotation speed Nco of the CVT 1 and the rotation speed No of the final output shaft 6.

Next, in a step S3, it is determined which range the position signal POS designates.

When the position signal POS designates the drive range (D), the routine proceeds to a step S4. When the position signal POS designates the neutral range (N) or the parking range (P), the routine proceeds to a step S7. When the position signal POS designates the reverse range (R), the routine proceeds to a step S8.

In the step S4, it is determined whether the current running mode is the power circulation mode or the direct mode based on the IVT ratio li found in the step S2. When the power circulation mode is applied, the routine proceeds to a step S5, and when the direct mode is applied, the routine proceeds to a step S6.

In the step S5, the differential pressure $\Delta P1$ of the line pressure PL and control pressure Pc1 is set to $\Delta P1 = f(APS, lc)$. This means that the differential pressure $\Delta P1$ is determined using a preset map or function based on the accelerator pedal depression amount APS and the speed ratio lc of the CVT 1. When the vehicle is moving forward in the power circulation mode, when the engine 70 is driving the drive wheels 11, the CVT 1 transmits a negative torque. Therefore, when the vehicle is running normally, negative torque control is performed by controlling the differential pressure $\Delta P1$ via the control pressure Pc1.

Figure 15:
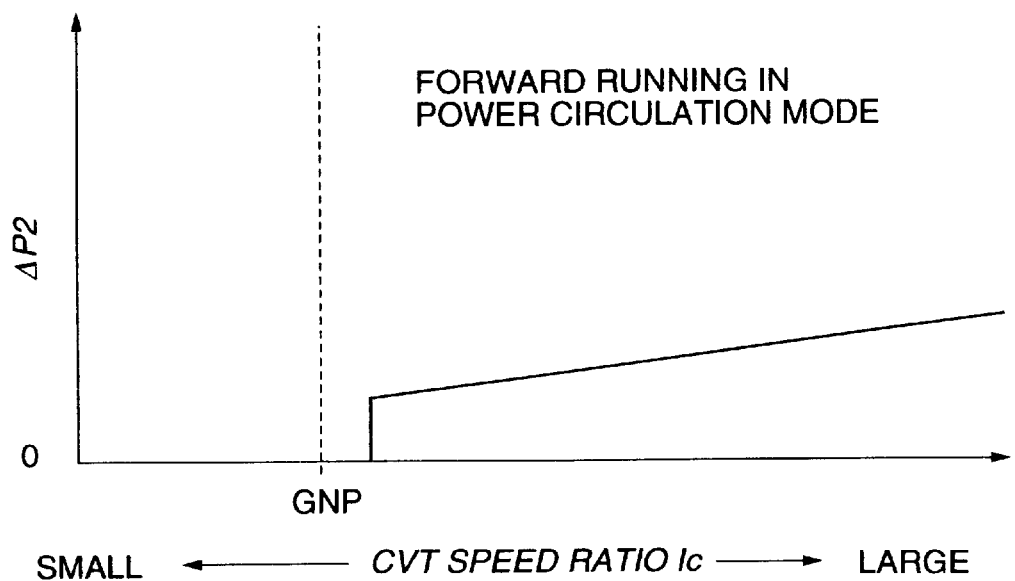
FIG. 15 is a diagram describing a limitation of the differential pressure applied by the differential pressure control routine when a vehicle is moving forward in a power circulation mode.

On the other hand, the differential pressure $\Delta P2$ of the line pressure PL and control pressure Pc2 is set to $\Delta P2 = f1(lc)$. This characteristic is shown in FIG. 15. Specifically, the increase of the differential pressure $\Delta P2$ is made gradual relative to the increase of the speed ratio lc of the CVT 1. When control of the differential pressure $\Delta P2$ is being performed in the power circulation mode, the control pressure Pc2 is controlled by an output signal to the solenoid valve 55 so that this characteristic is realized. Therefore, when the vehicle is moving forward in the power circulation mode, increase of the differential pressure $\Delta P2$ is suppressed by controlling the control pressure Pc2 even if the port 70F of the speed ratio control valve 70 communicates with the upshift oil chambers 101 due to a fault or incorrect operation of the step motor 36, or sticking of the spool 73 of the speed ratio control valve 70. By limiting the transmission of positive torque due to the CVT 1 by suppressing increase of the differential pressure $\Delta P2$, unintended, excessive engine braking is prevented from occurring.

In the step S6, the differential pressure $\Delta P2$ of the line pressure PL and control pressure Pc2 is set to $\Delta P2 = f(APS, lc)$. This means that the differential pressure $\Delta P2$ is determined using a preset map or function based on the accelerator pedal depression amount APS and speed ratio lc of the CVT 1. When the vehicle is moving forward in the direct mode, when the engine 70 is driving the drive wheels 11, the CVT 1 transmits a positive torque. Therefore, when the vehicle is running normally, positive torque control is performed by controlling the differential pressure $\Delta P2$ via the control pressure Pc2.

Also, the differential pressure $\Delta P1$ of the line pressure PL and control pressure Pc1 is set to $\Delta P1 = f2(lc) = K \cdot \text{Tolmt}$.

Figure 16:
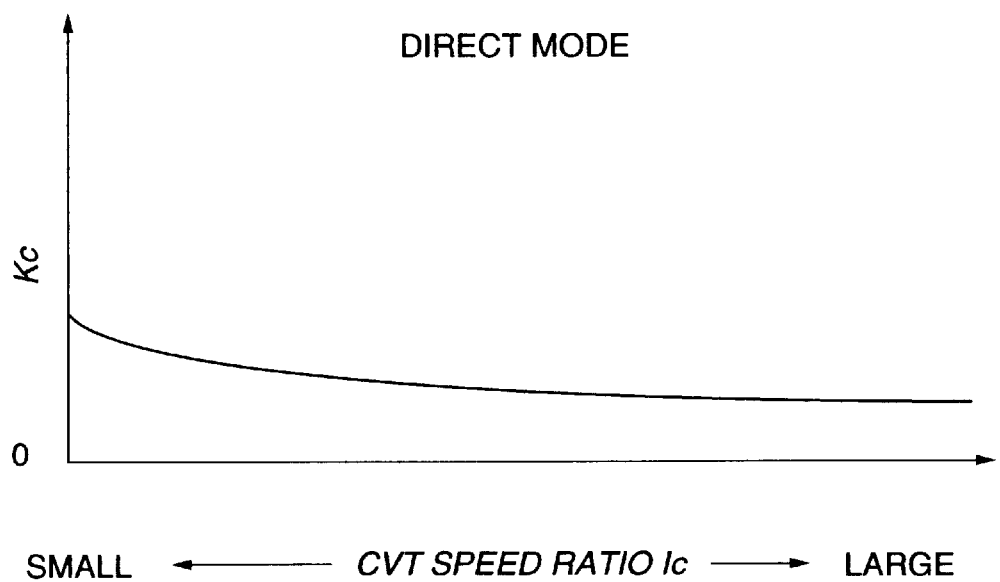
FIG. 16 is a diagram describing the contents of a map of a parameter K c used when the differential pressure control routine determines a differential pressure limiting value in a direct mode.

Here, Tolmt is a limiting value of the transmission torque which is set so that the engine braking does not exceed a preset deceleration, and it is a constant value. K c is set to gradually increase as the speed ratio lc of the CVT 1 decreases, as shown in FIG. 16. In the direct mode, if the port 70E communicates with the upshift oil chambers 101 due to a fault or incorrect operation of the step motor 36, or to sticking of the spool 73 of the speed ratio control valve 70, the negative torque causes engine braking according to the differential pressure ΔP1 of the line pressure PL and control pressure Pc1.

By specifying the differential pressure ΔP1 based on the parameter K c and limiting value Tolmt of the transmission torque, the differential pressure ΔP1 is controlled to be equal to or less than a predetermined value, and the negative torque due to engine braking is effectively limited to a fixed value.

In a step S7 corresponding to the neutral range (N) or parking range (P), torque transmission is allowed in either direction to start the vehicle by setting the differential pressure ΔP1=ΔP2=f (APS, lc).

In the step S5, the differential pressure ΔP2 of the line pressure PL and control pressure Pc2 is set to ΔP2=f(APS, lc). In the reverse range (R), the power circulation mode is selected, and the vehicle runs only in the region where the speed ratio li of the IVT is negative, as shown in FIG. 23.

In the state where the engine 70 drives the drive wheels 11, the transmitted torque of the CVT 1 is a positive torque. Therefore, positive torque control is performed by controlling the differential pressure ΔP2 via the control pressure Pc2.

Figure 17:
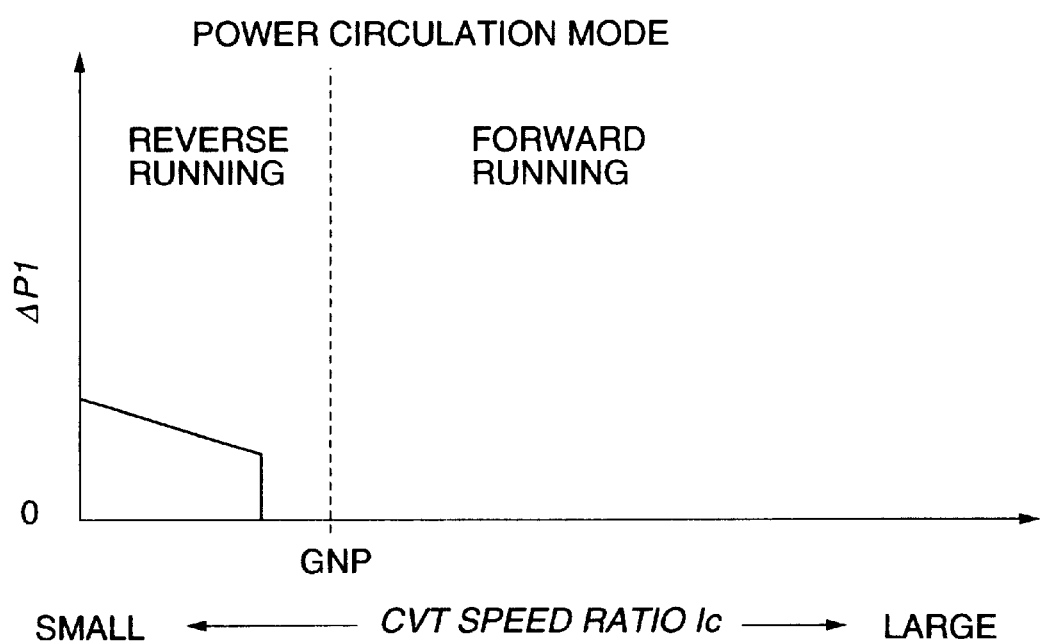
FIG. 17 is a diagram describing a limitation of the differential pressure applied by the differential pressure control routine when a vehicle is moving backwards in the power circulation mode.

On the other hand, the transmitted torque of the CVT 1 corresponding to engine braking is a negative torque. Hence, the differential pressure ΔP1 of the line pressure PL and control pressure Pc1 is set to ΔP1=f3 (lc). This characteristic is shown in FIG. 17. Specifically, the differential pressure ΔP1 is made to gradually increased as the speed ratio lc of the CVT 1 decreases, i.e., as the speed ratio li of the IVT increases. Due to the setting, the negative torque transmission force is suppressed, and excessive engine braking unintended by the driver is prevented.

After the processing of any of the steps S5, S6, S7, S8 has been performed, in a step S9, the routine outputs a signal calculated based on the set characteristics to the solenoid valve 50 or 55, and the routine is terminated.

In this way, the control unit 300 controls the transmission torque of the CVT 1 when the engine 79 drives the drive wheels 11, and suppresses increase of the transmission torque of the CVT 1 corresponding to engine braking, by controlling the differential pressures ΔP1, ΔP2 respectively for the power circulation mode and direct mode.

Therefore, excessive engine braking unintended by the driver is prevented from acting even in the event of incorrect operation or a fault of the step motor 6, damage to the speed change link 37, or sticking of the spool 73.

Further, the rate of gyration angle variation of the power rollers 18C, 18D, 20C, 20D is also suppressed by suppressing increase of the differential pressure supporting the transmission torque of the CVT 1 corresponding to engine braking. Therefore, engine braking is prevented from acting suddenly.

Next, a fifth embodiment of this invention will be described referring to FIGS. 18–20.

In this embodiment, the positive torque control valve 40 and negative torque controller 45 of the fourth embodiment are replaced by normal closed valves 41, 46. Instead of the speed ratio control valve 70, a speed ratio control valve 70A is used. The speed ratio control valve 70A is provided with a port 70I and a port 70J instead of the port 70F of the speed ratio control valve 70. A control pressure Psinc of the positive torque control valve 41 is supplied to the port 70I. A control pressure Psdec of the negative torque control valve 46 is supplied to the port 70J. Also, the ports 70D, 70E are both connected to the drain. The remaining features of the construction are identical to those of the fourth embodiment.

Figure 18:
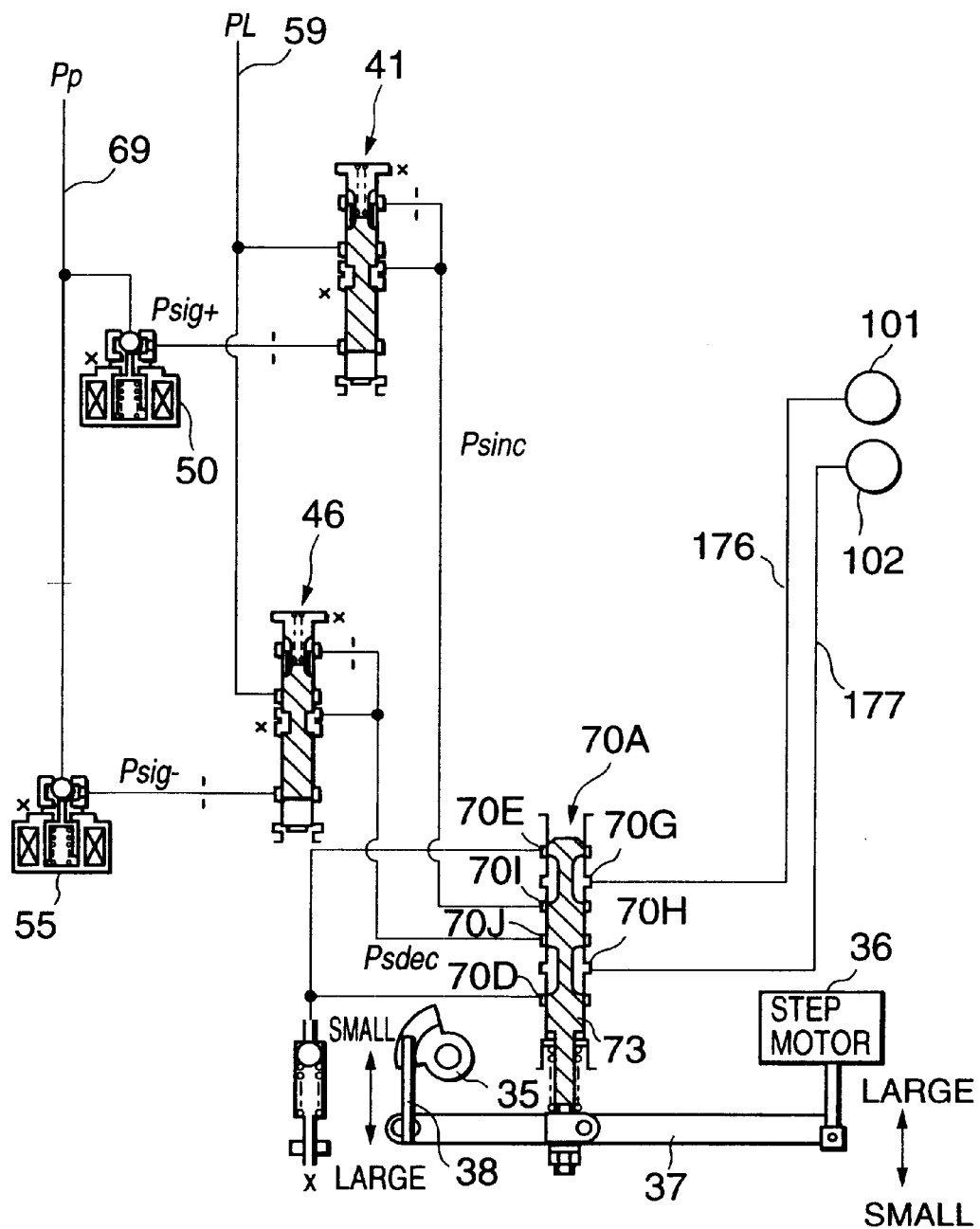
FIG. 18 is an oil pressure circuit diagram of the infinite speed ratio transmission device according to a fifth embodiment of this invention.

The spool 73 of the speed ratio control valve 70 supplies the control pressure Psdec of the port 70J to the downshift oil chambers 102 via the port 70H by displacing to the upper part of FIG. 18, and releases the pressure of the upshift oil chambers 101 from the port 70G to the drain via the port 70E.

By displacing to the lower part of FIG. 18, the control pressure Psinc of the port 70I is supplied to the upshift oil chambers 101 via the port 70G, and the oil pressure of the downshift oil chambers 102 is released to the drain via the port 70H and port 70D.

Figure 19:
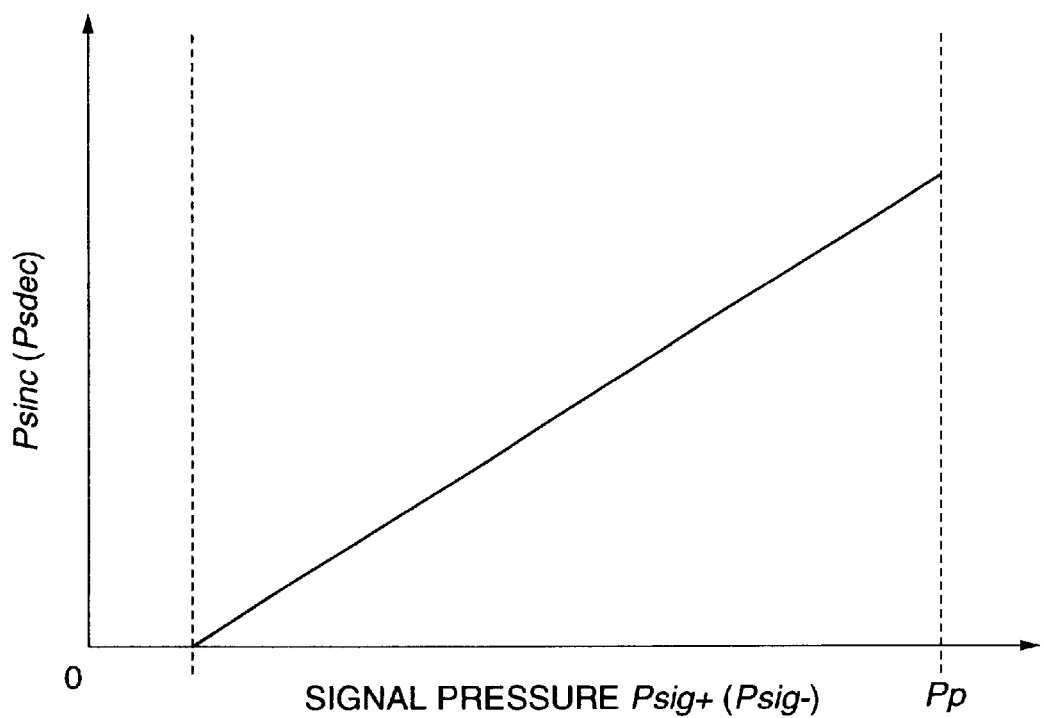
FIG. 19 is a diagram showing a relation between the signal pressure and a control pressure according to the fifth embodiment of this invention.

Referring to FIG. 19, the positive torque control valve 41 has characteristics so as to increase the control pressure Psinc from 0 to the line pressure PL as the signal pressure Psig+ from the solenoid valve 50 increases from 0. Likewise, the negative torque control valve 46 increases the control pressure Psdec according to increase of the signal pressure Psig– from the solenoid valve 55.

Speed ratio control of the IVT is performed by maintaining the control pressure Psinc of the positive torque control valve 41 and the control pressure Psdec of the negative torque control valve 46 constant, and controlling the supply direction and supply flowrate of oil pressure supplied by the speed ratio control valve 70 to the upshift oil chambers 101 and downshift oil chambers 102.

When the control pressure Psinc is varied in the state where the port 70G is connected to the port 70I, or the control pressure Psdec is varied in the state where the port 70H is connected to the port 70J, the differential pressure ΔP1 or ΔP2 acting on the servo pistons 106, 107, 116, 117 becomes equal to the control pressure Psinc or Psdec. Therefore, the transmission torque of the CVT 1 can be controlled by oil pressure control of either of the oil chambers 101 or oil chambers 102.

By controlling the transmission torque of the CVT 1 respectively for the power circulation mode and direct mode as described above, and controlling the control pressures Psinc, Psdec as in this embodiment, the transmission torque of the CVT 1 corresponding to engine braking is prevented from becoming excessive.

For example, by controlling the control pressure Psinc of the upshift oil chambers 101, when the torque of the engine 70 is transmitted to the drive wheels 11, the upper limit of the control pressure Psdec corresponding to the transmission torque corresponding to engine braking is limited to a preset limiting value f1 (lc) or f3 (lc). By controlling the control pressure Psdec of the downshift oil chambers 102, when the torque of the engine 70 is transmitted to the drive wheels 11, the upper limit of the control pressure Psdec corresponding to the transmission torque corresponding to engine braking is limited to a preset limiting value f2 (lc).

Figure 20:
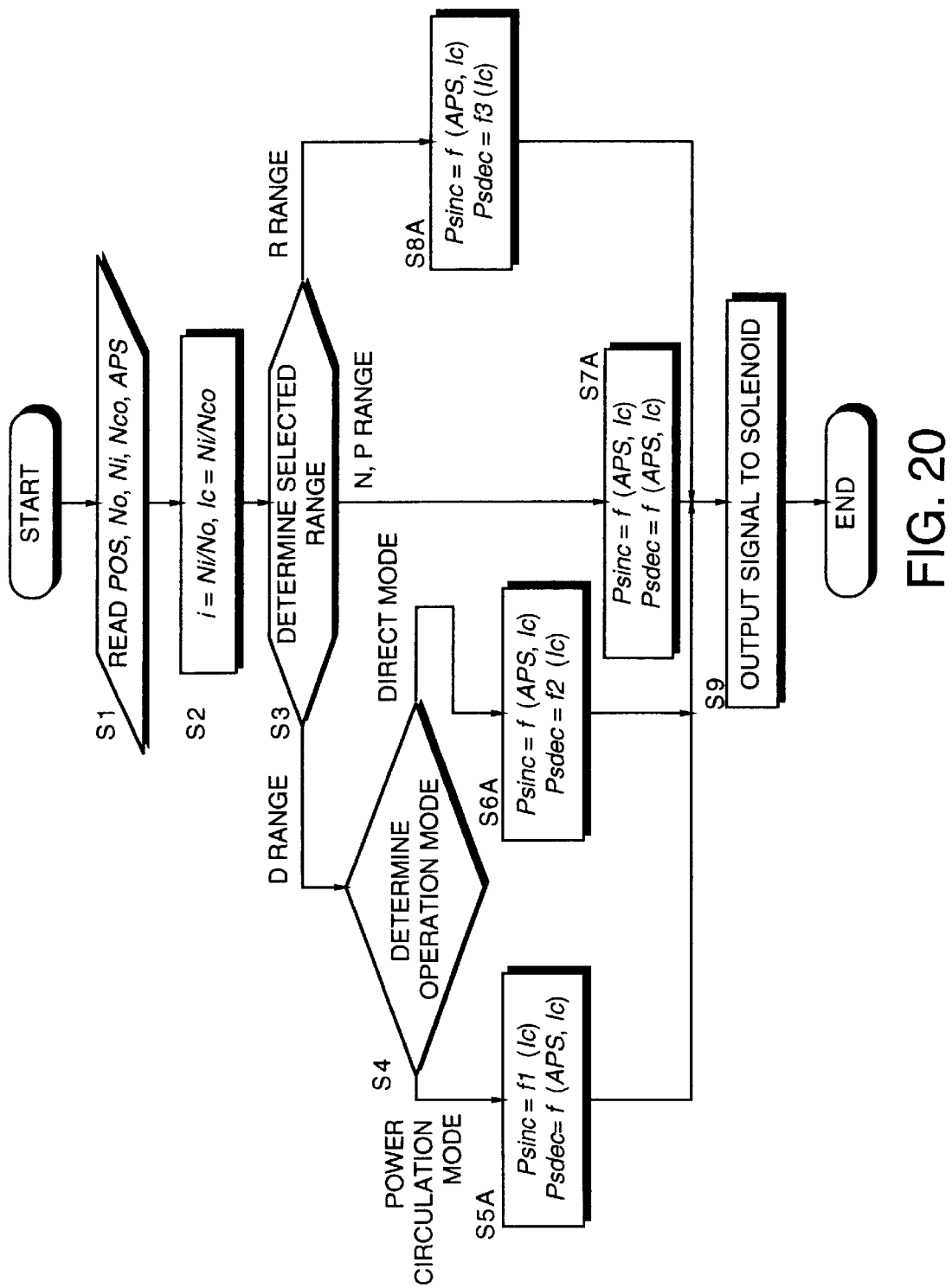
FIG. 20 is a flowchart describing the differential pressure control routine performed by the control unit according to the fifth embodiment of this invention.

For this purpose, the control unit 300 performs the control routine shown in FIG. 20. In this control routine, the steps S5, S6, S7, S8 of the control routine of FIG. 14 of the fourth embodiment are respectively replaced by steps S5A, S6A, S7A, S8A. The remaining step steps are identical to those of the control routine of the first embodiment.

In the step S5A, the control pressure Psdec is set to Psdec=f(APS, lc), and the control pressure Psinc is set to Psinc=f1(lc).

In the step S6A, the control pressure Psdec is set to Psdec=f2(lc), and the control pressure Psinc is set to Psinc=f(APS, lc).

In the step S7A, the control pressure Psinc is set to Psinc=f(APS, lc), and the control pressure Psdec is set to Psdec=f(APS, lc).

In the step S8A, the control pressure Psdec is set to Psdec=f3(lc), and the control pressure Psinc is set to Psinc=f(APS, lc).

As in the case of the fourth embodiment, the limiting values f1(lc)–f3(lc) are set to gradually vary according to the speed ratio lc of the CVT 1, but they may also be set to fixed values.

A sixth embodiment of this invention will now be described referring to FIGS. 21 and 22.

According to this embodiment, the speed ratio control valve 70 of the fourth embodiment is combined with the positive torque control valve 41 and negative torque control valve 46 of the fifth embodiment, and normally open solenoid valves 50A, 55A are used instead of the solenoid valves 50, 55.

The positive torque control valve 41 and negative torque control valve 46 are normally closed, but the solenoid valves 50A, 55A are normally open. Hence, when the solenoids of the solenoids valves 50A, 55A are not energized, the signal pressures Psig+ and Psig− respectively become equal to the pilot pressure Pp.

Figure 21:
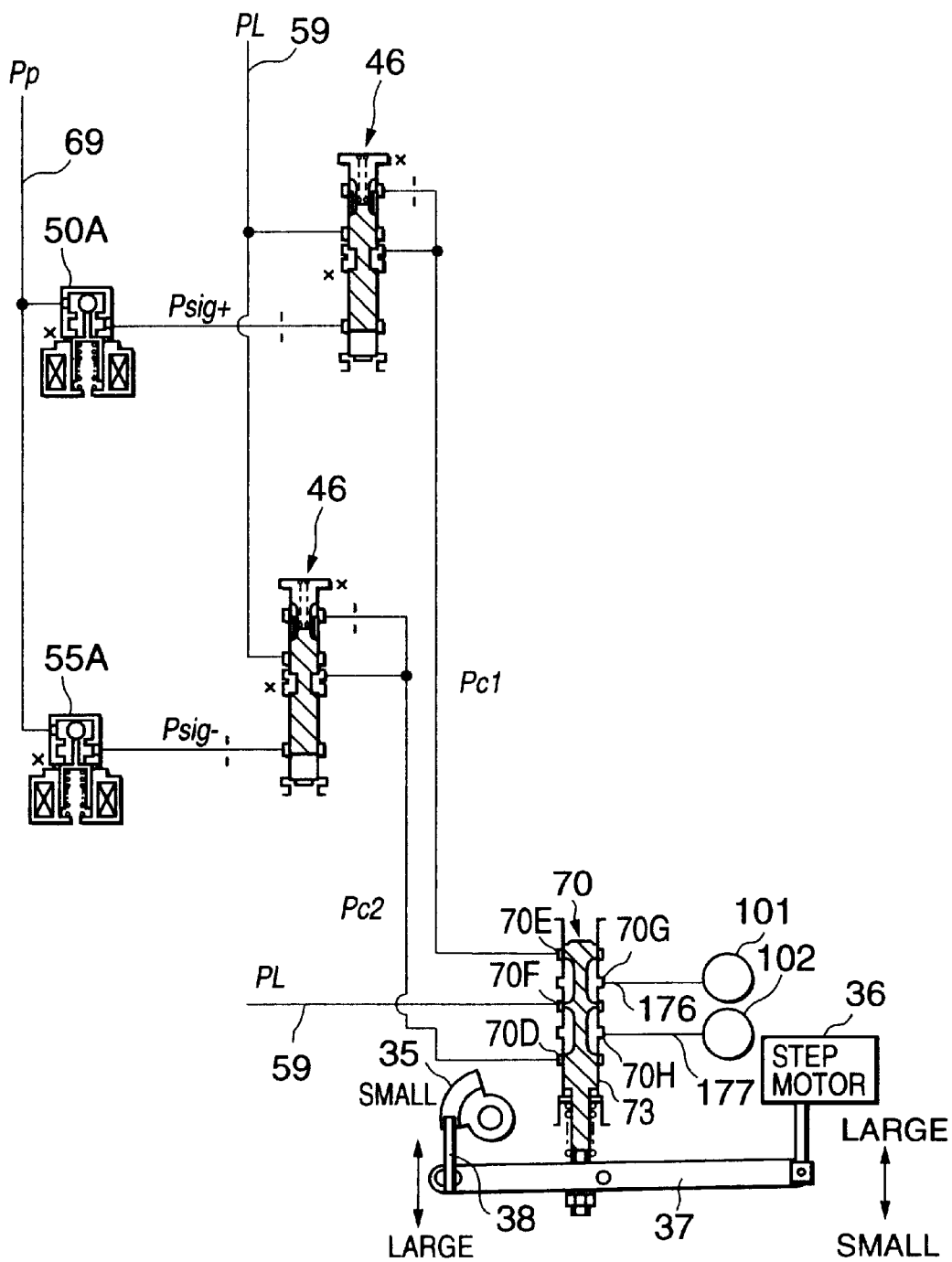
FIG. 21 is an oil pressure circuit diagram of the infinite speed ratio transmission device according to a sixth embodiment of this invention.
Figure 22:
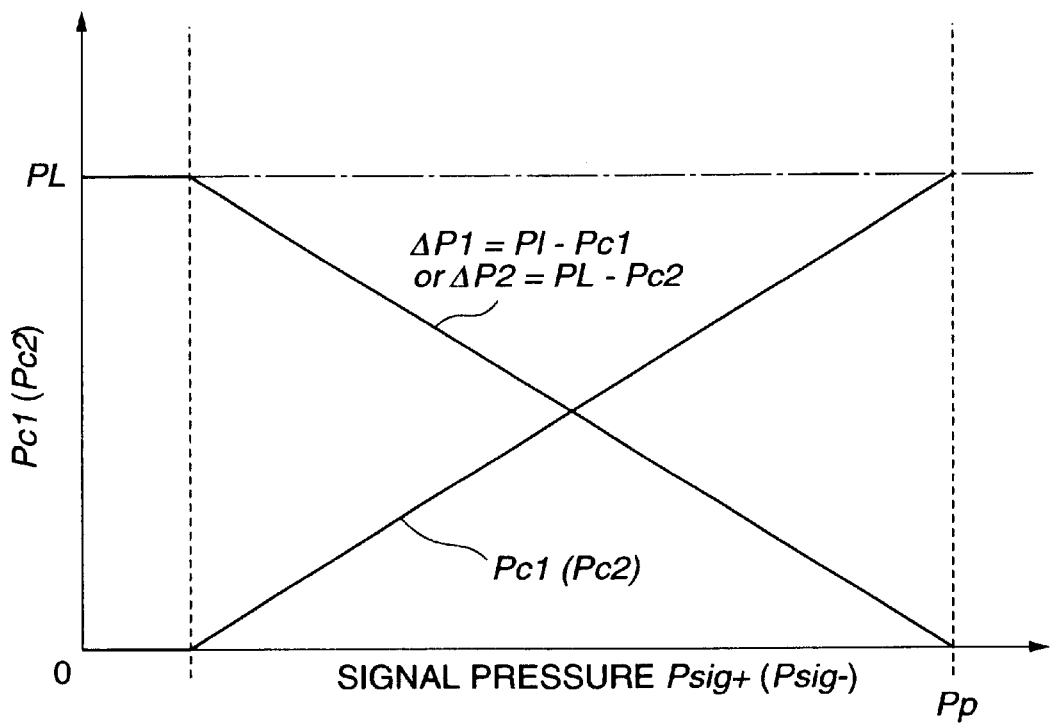
FIG. 22 is a diagram showing a relation between the signal pressure and the control pressure according to the sixth embodiment of this invention.

When the solenoids valves 50A, 55A are not energized, therefore, the spools of the positive torque control valve 41 and negative torque control valve 46 move upwards in FIG. 21, and the line pressure passage 59 is connected to the ports 40D, 45D.

Therefore, the control pressures Pc1, Pc2 become equal to the line pressure PL, and the differential pressure ΔP1 of the port 70F and port 70E of the speed ratio control valve 70 and the differential pressure ΔP2 of the port 70F and port 70D, both become zero. This provides a failsafe mechanism when, for example, there is a break in the cable used to energize the solenoids.

When the solenoid valves 50A, 55A operate, the control pressure Pc1 (Pc2) increases according to the increase of the signal pressure Psig+ (Psig−). Hence, the differential pressure ΔP1 (ΔP2) of the oil chambers 101 and oil chambers 102 is controlled by varying the control pressure Pc1 (Pc2).

According to this embodiment, the relation between the signal pressure Psig+ and control pressure Pc1, and the relation between the signal pressure Psig− and control pressure Pc2, are the reverse of those of the fourth embodiment, but the transmission torque control routine applied in this embodiment is identical to the routine of FIG. 14 of the fourth embodiment. Also in this embodiment, unintended, excessive engine braking can be prevented by controlling the transmission torque as in the fourth embodiment.

The contents of Tokugan Hei 11-319571, with a filing date of Nov. 10, 2000 in Japan, and Tokugan 2000-53133 with a filing date of Feb. 29, 2000 in Japan are hereby incorporated by reference.

Although the invention has been described above by reference to certain embodiments of the invention, the invention is not limited to the embodiments described above. Modifications and Variations of the embodiments described above will occur to those skilled in the art, in light of the above teachings.

The embodiments of this invention in which an exclusive property or privilege is claimed are defined as follows:

What is claimed is:

1. A controller for a toroidal continuously variable transmission of a vehicle, the transmission comprising an input disk which rotates about a rotation shaft, an output disk which rotates about the rotation shaft, a power roller gripped by the input disk and the output disk and transmitting a torque between the input disk and output disk, and a trunnion which drives the power roller in a direction perpendicular to the rotation shaft according to a differential pressure of a first oil chamber and a second oil chamber, the transmission causing a downshift when the second oil chamber is at a higher pressure than the first oil chamber, and causing an upshift when the first oil chamber is at a higher pressure than the second oil chamber, the first oil chamber being connected to a first passage and the second oil chamber being connected to a second oil passage, the controller comprising:

a speed ratio control valve which controls a direction and a flowrate of oil in the first oil passage and the second oil passage; and a pressure control valve which limits a maximum differential pressure of the first oil chamber and the second oil chamber when the transmission causes a downshift smaller than a maximum differential pressure of the first oil chamber and the second oil chamber when the transmission causes an upshift.

2. The controller as defined in claim 1, wherein the pressure control valve is a valve which limits the differential pressure of the second oil chamber and the first oil chamber by increasing the pressure of the first oil chamber depending on the increase of the pressure of the second oil chamber when the transmission causes a downshift.

3. The controller as defined in claim 2, wherein the speed ratio control valve is a valve which connects one of the first oil chamber and the second oil chamber to a pressure source and connects the other of the first oil chamber and the second oil chamber to a drain, and a pressure control valve is installed midway in a passage leading from the first oil chamber to the drain which is formed when the speed ratio control valve connects the first oil chamber to the drain.

4. The controller as defined in claim 3, wherein the pressure control valve is a valve which controls the pressure of the first oil chamber so that the differential pressure of the second oil chamber and first oil chamber is maintained at a fixed value when the second oil chamber has risen above a fixed pressure.

5. The controller as defined in claim 1, wherein the pressure control valve is a valve which limits a pressure rise of the second oil chamber.

6. The controller as defined in claim 5, wherein the speed ratio control valve is a valve which connects one of the first oil chamber and the second oil chamber to a pressure source and connects the other of the first oil chamber and the second oil chamber to a drain, and a pressure control valve is installed midway in a passage leading from the pressure source to the second oil chamber which is formed when the speed ratio control valve connects the second oil chamber to the pressure source.

7. The controller as defined in claim 6, wherein the pressure control valve is a valve which maintains the pressure of the second oil chamber at a first constant pressure when the pressure of the first oil chamber has become less than a second constant pressure lower than the first constant pressure.

8. The controller as defined in claim 1, wherein the speed ratio control valve is a valve which connects one of the first oil chamber and the second oil chamber to a pressure source, and connects the other of the first oil chamber and the second oil chamber to a pressure control valve, and the controller further comprises a microprocessor programmed to control the pressure control valve to prevent the differential pressure of the first oil chamber and the second oil chamber from rising above a predetermined pressure.

9. The controller as defined in claim 8, wherein the pressure control valve comprises a first pressure control valve and second pressure control valve, the speed ratio control valve comprises a first port connected to a pressure source, a second port connected to the first pressure control valve, a third port connected to the second pressure control valve, a fourth port connected to the first oil chamber, a fifth port connected to the second oil chamber, and a spool which displaces between a position wherein the fourth port is connected to the first port and the fifth port is connected to the third port, and a position wherein the fourth port is connected to the second port and the fifth port is connected to the first port, and the microprocessor is further programmed to control the pressure control valve to prevent the differential pressure of the pressure source and the second port from rising above a predetermined pressure.

10. The controller as defined in claim 9, wherein the controller further comprises a sensor which detects a speed ratio of the toroidal continuously variable transmission, and the microprocessor is further programmed to increase the predetermined pressure according to the decrease of the speed ratio.

11. The controller as defined in claim 8, wherein the controller comprises a first pressure control valve and second pressure control valve, the speed ratio control valve comprises a first port connected to the first pressure control valve, a second port connected to the second pressure control valve, a third port connected to a drain, a fourth port connected to the first oil chamber, a fifth port connected to the second oil chamber, and a spool which displaces between a position wherein the fourth port is connected to the first port and the fifth port is connected to the third port, and a position wherein the fourth port is connected to the third port and the fifth port is connected to the second port, and the microprocessor is further programmed to control the second pressure control valve to prevent a pressure of the second port from rising above a predetermined pressure.

12. The controller as defined in claim 1, wherein the rotation shaft and the input disk rotate together, and the toroidal continuously variable transmission forms an infinite variable speed ratio transmission device together with a fixed speed ratio transmission which transmits a rotation speed of the rotation shaft at a fixed speed ratio to a fixed speed ratio transmission output shaft, and a planetary gear set comprising a first rotating element connected to the output disk, a second rotating element connected to the fixed speed ratio transmission output shaft via a power circulation clutch, and a third rotating element varying a direction and a speed of rotation according to a difference in a rotation speed of the first rotating element and a rotation speed of the second rotating element, the third rotating element being connected to the output disk via a direct clutch, and the vehicle running according to the rotation of the third rotating element.

13. The controller as defined in claim 12, wherein the controller further comprises a microprocessor programmed to control the pressure control valve, when the direct clutch is engaged and the power circulation clutch is disengaged, to limit the pressure difference of the first oil chamber and the second oil chamber when the transmission causes a downshift to be less than the pressure difference of the first oil chamber and the second oil chamber when the transmission causes an upshift, and to control the pressure control valve, when the direct clutch is disengaged and the power circulation clutch is engaged, to limit the pressure difference of the first oil chamber and the second oil chamber when the transmission causes an upshift to be less than the pressure difference of the first oil chamber and the second oil chamber when the transmission causes a downshift.

14. The controller as defined in claim 13, wherein the vehicle comprises a shift lever which changes over between forward running and reverse running, the controller comprises a sensor which detects a position of the shift lever, and the microprocessor is further programmed to control the pressure control valve, when the shift lever is in the reverse position, to limit the pressure difference of the first oil chamber and the second oil chamber when the transmission causes a downshift to be less than the pressure difference of the first oil chamber and the second oil chamber when the transmission causes an upshift.

* * * * *